(12) United States Patent
Trobee

(10) Patent No.: US 6,491,490 B1
(45) Date of Patent: Dec. 10, 2002

(54) METHOD OF APPARATUS FOR LIFTING AND TOWING A LOAD

(76) Inventor: Wayne G. Trobee, Rt. 2, Box 51, Ninnekah, OK (US) 73067

( * ) Notice: Subject to any disclaimer, the term of this patent is extended or adjusted under 35 U.S.C. 154(b) by 0 days.

(21) Appl. No.: 09/849,177

(22) Filed: May 4, 2001

(51) Int. Cl.[7] .................................................. B65F 3/26
(52) U.S. Cl. ...................................... 414/563; 280/402
(58) Field of Search ................................ 414/481, 495, 414/563; 212/348; 114/250; 280/402; 214/86

(56) References Cited

U.S. PATENT DOCUMENTS

| | | | | |
|---|---|---|---|---|
| 4,149,643 A | * | 4/1979 | Skala et al. | 280/402 |
| 4,544,175 A | * | 10/1985 | Hubert | 280/402 |
| 4,555,214 A | * | 11/1985 | Morton | 280/402 |
| 4,708,358 A | * | 11/1987 | Gehman et al. | 280/402 |
| 4,899,681 A | * | 2/1990 | Ottsman et al. | 114/230.17 |
| 5,398,923 A | | 3/1995 | Perry et al. | 254/375 |
| 5,845,920 A | * | 12/1998 | Hill | 280/402 |
| 6,120,051 A | * | 9/2000 | Lichter et al. | 280/402 |

* cited by examiner

Primary Examiner—Kathy Matecki
Assistant Examiner—Charles A. Fox
(74) Attorney, Agent, or Firm—Thomas R. Weaver

(57) ABSTRACT

This invention provides an apparatus and a method of using the apparatus to lift a load, such as one end of a vehicle, to enable movement of the load from one location to another. The apparatus is comprised of an elongated member, such as a beam, and a winch slidably mounted on the elongated member which, in combination with the load itself and a stationary base, such as another vehicle, operates to lift and move the load.

9 Claims, 11 Drawing Sheets

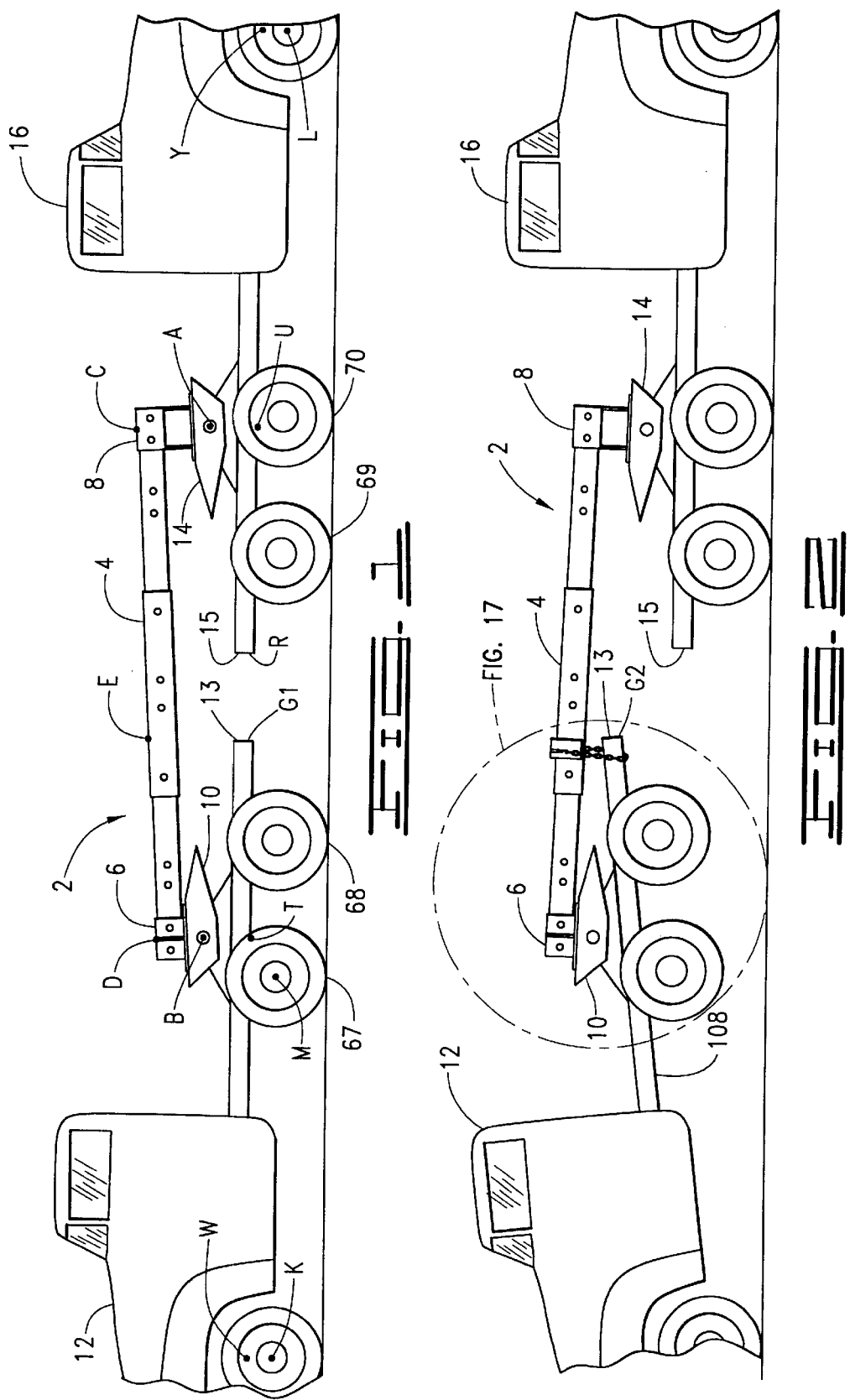

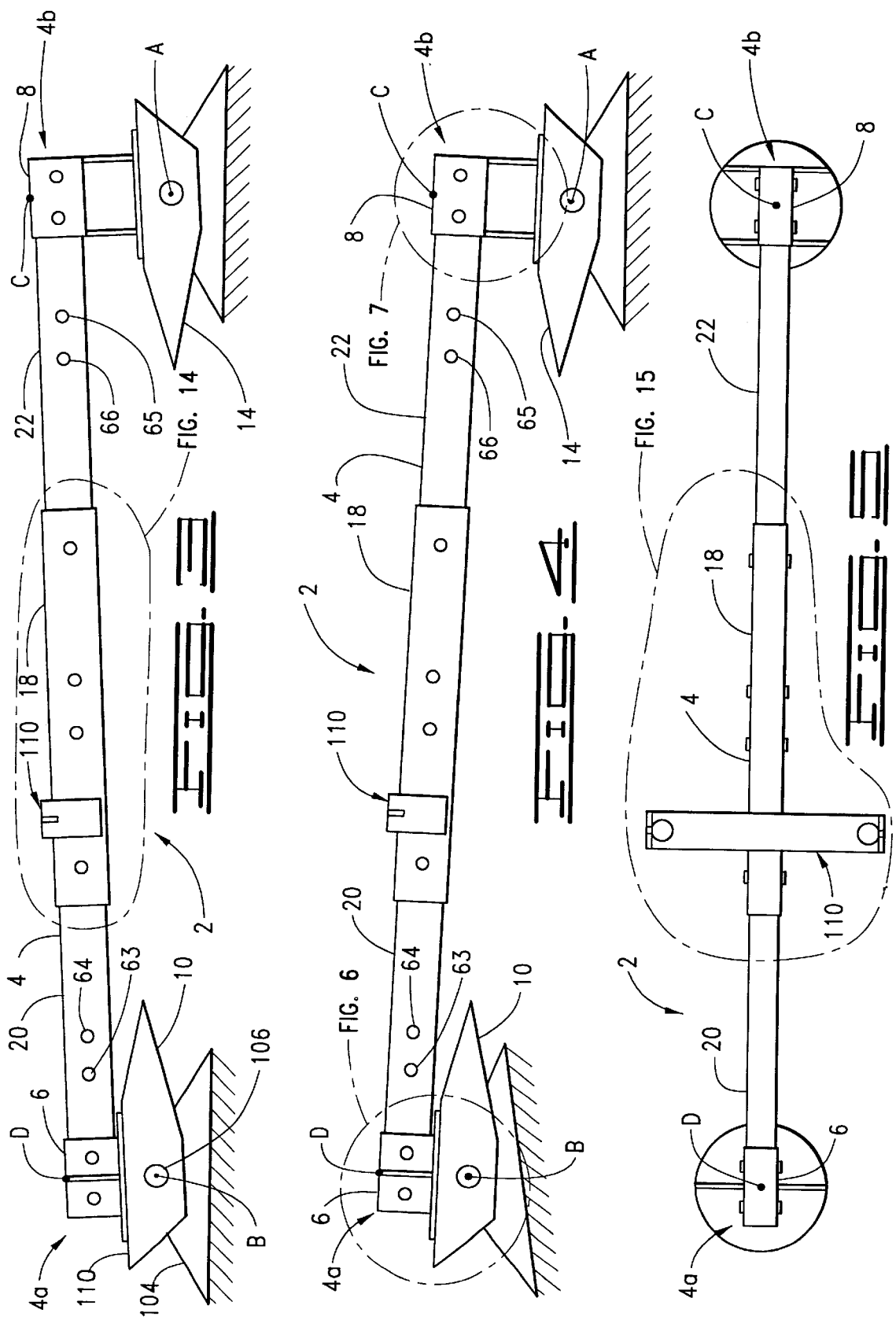

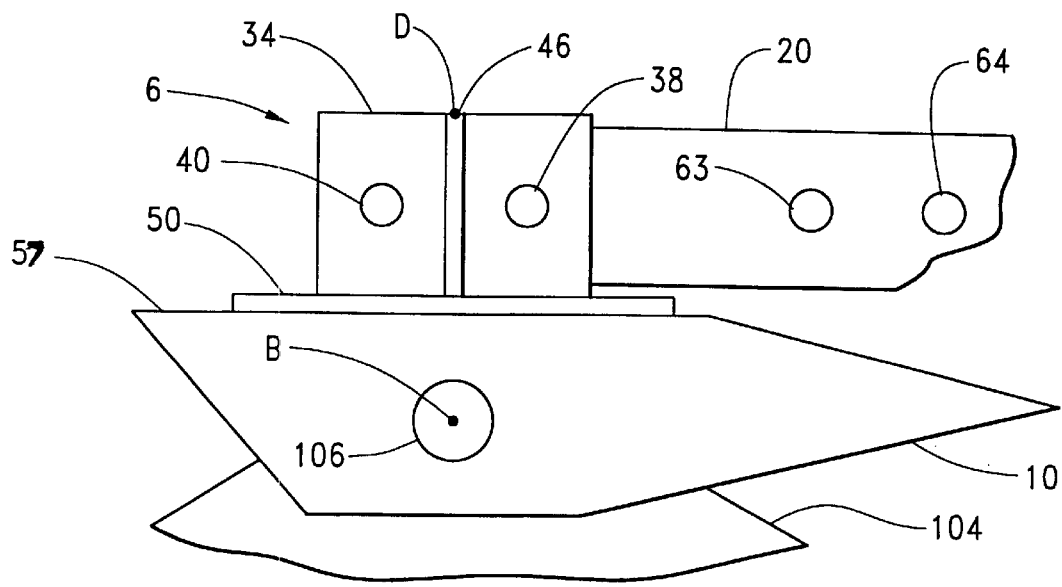
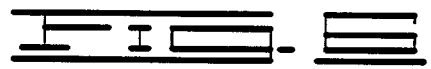
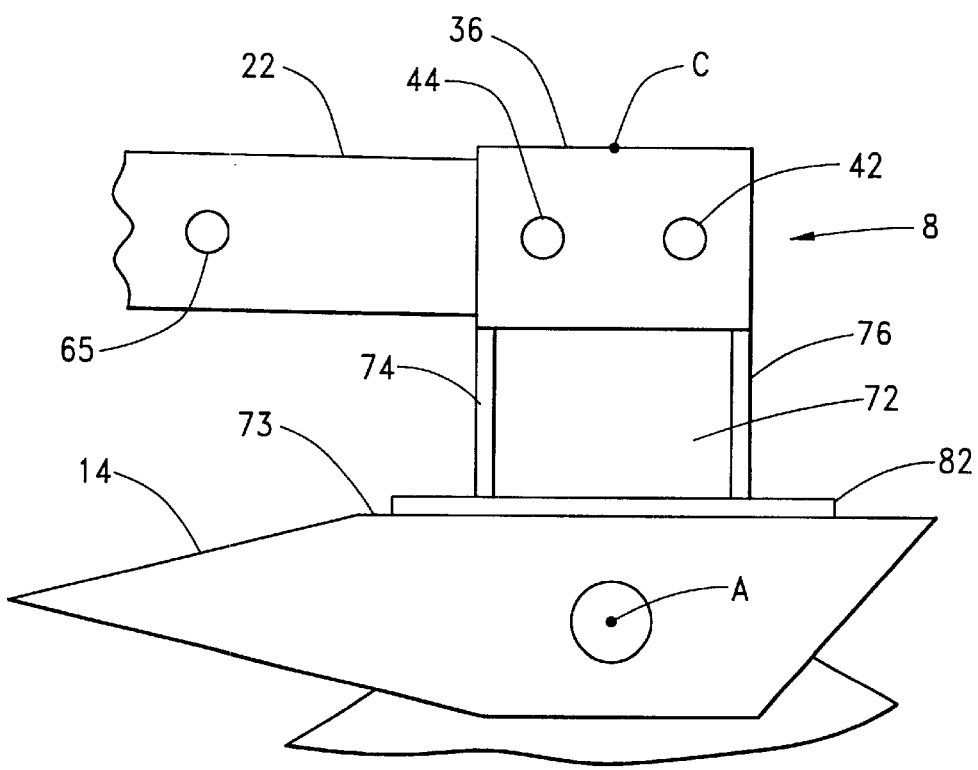
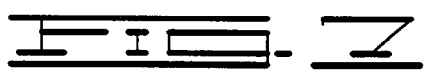

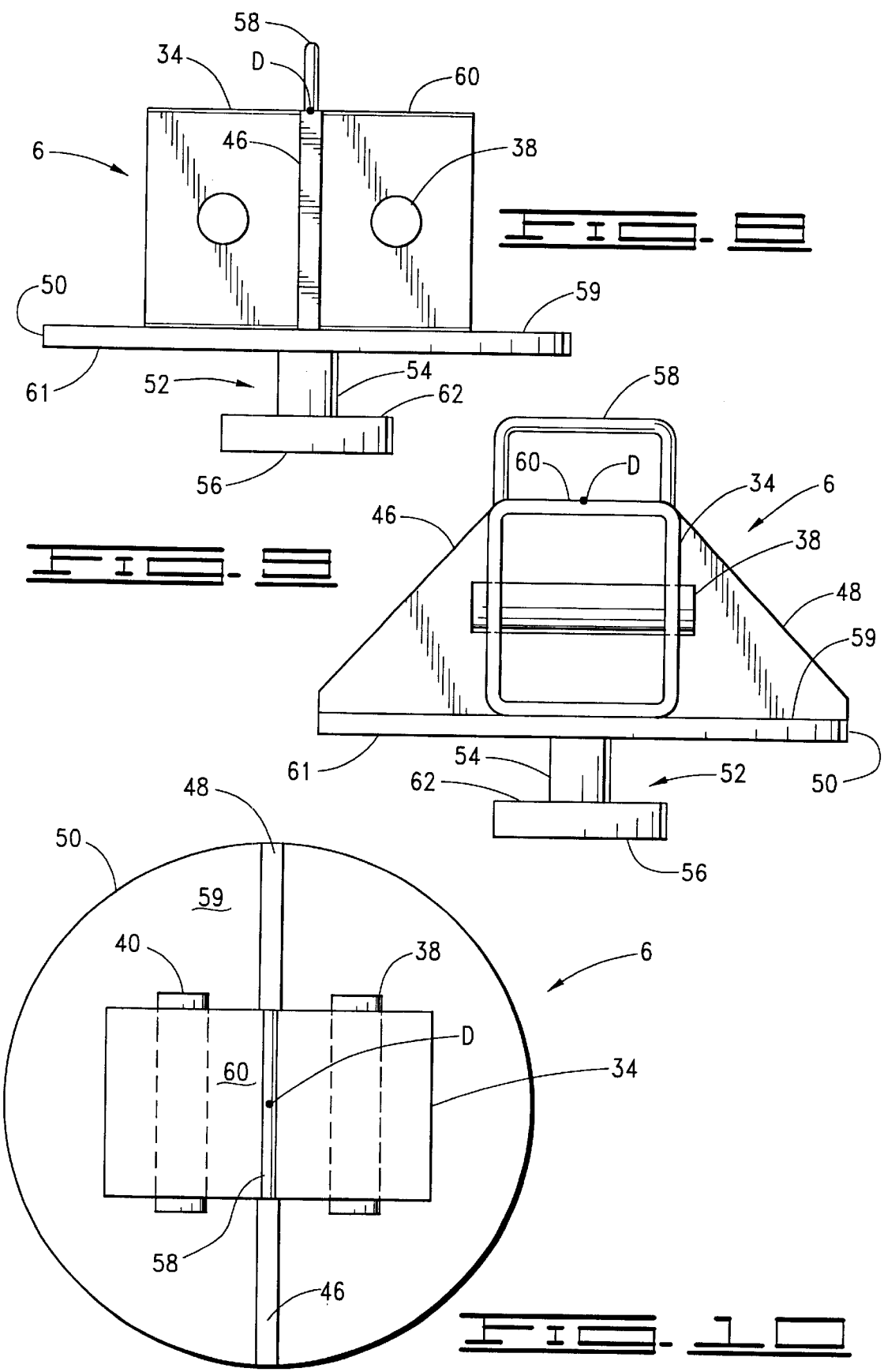

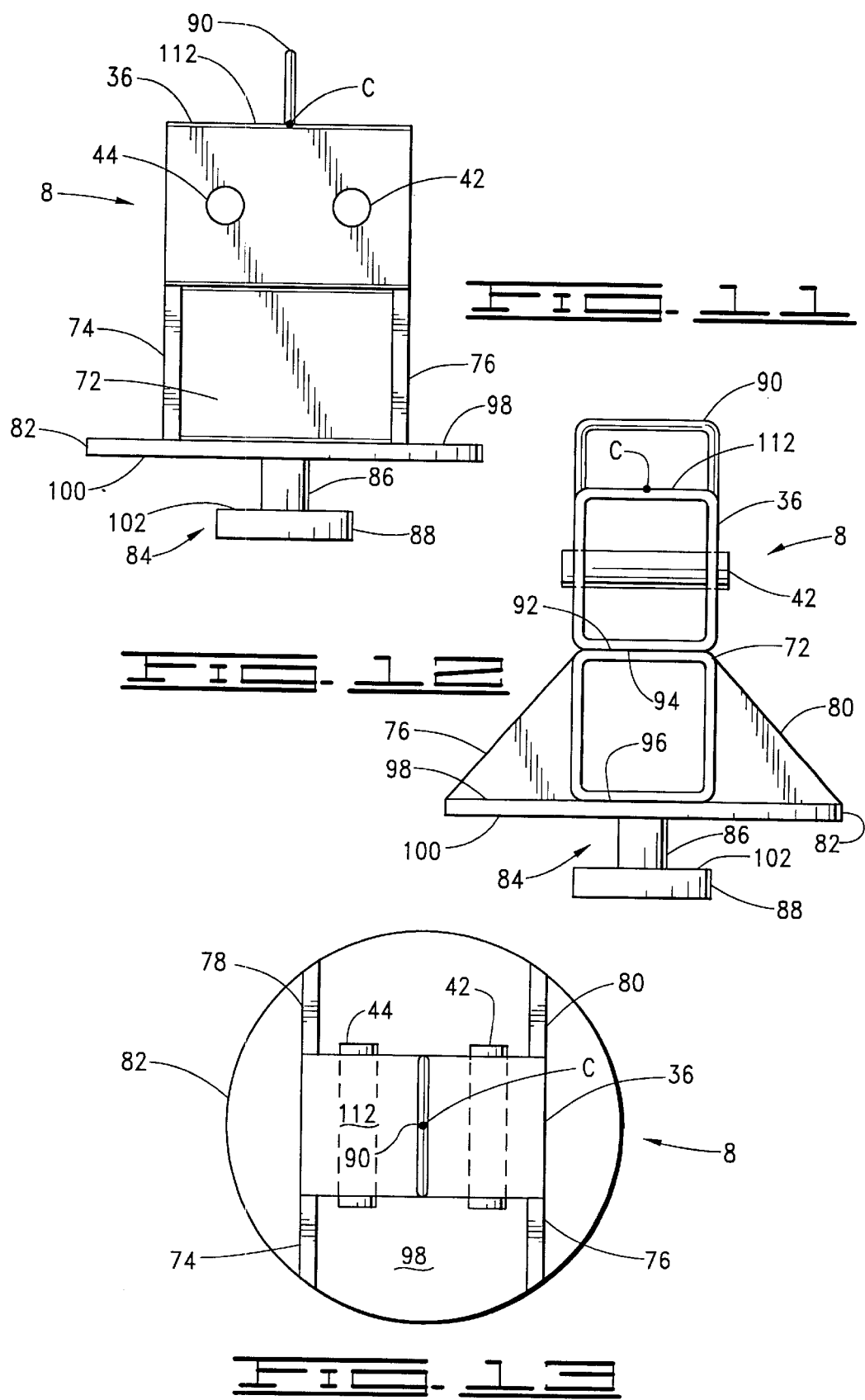

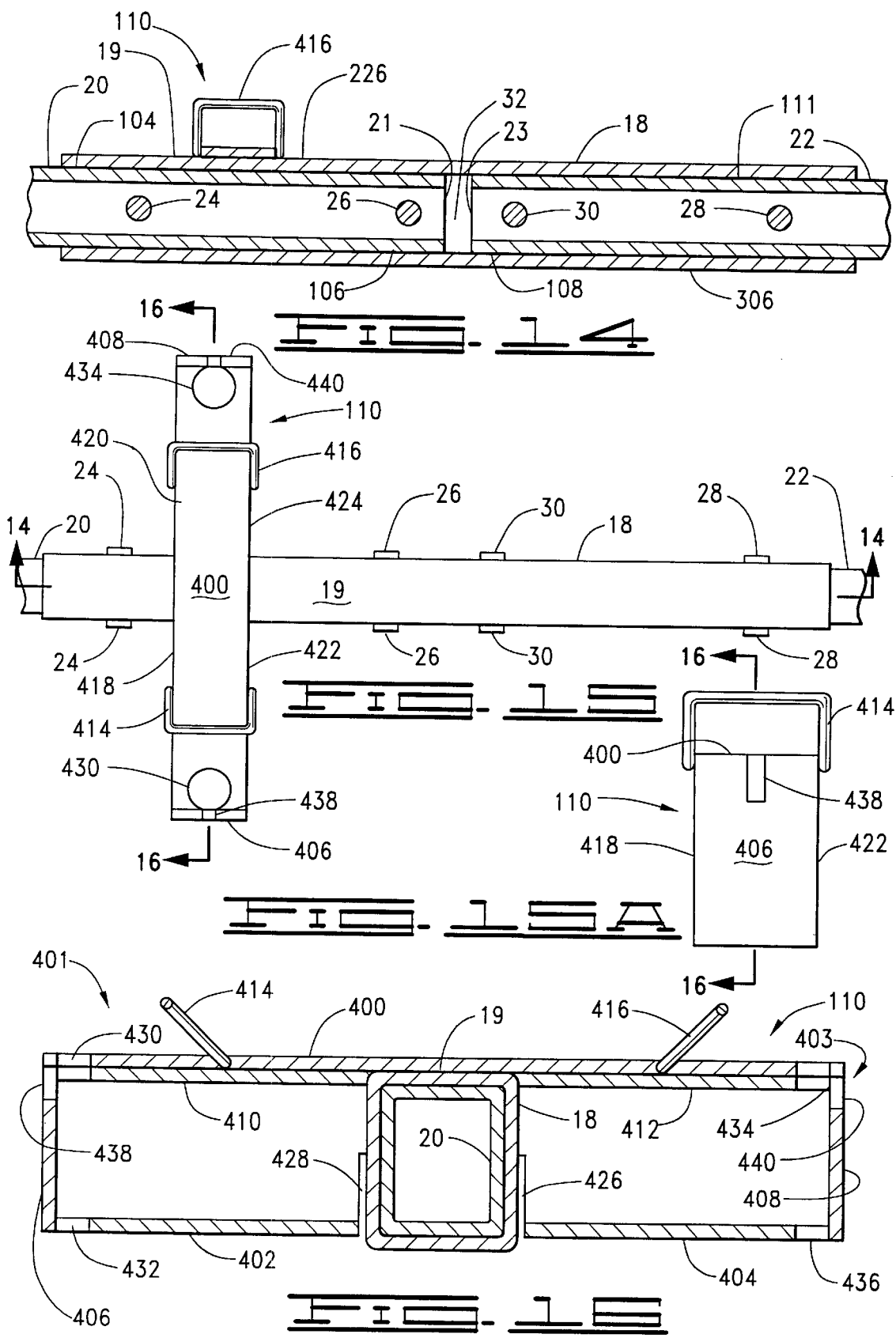

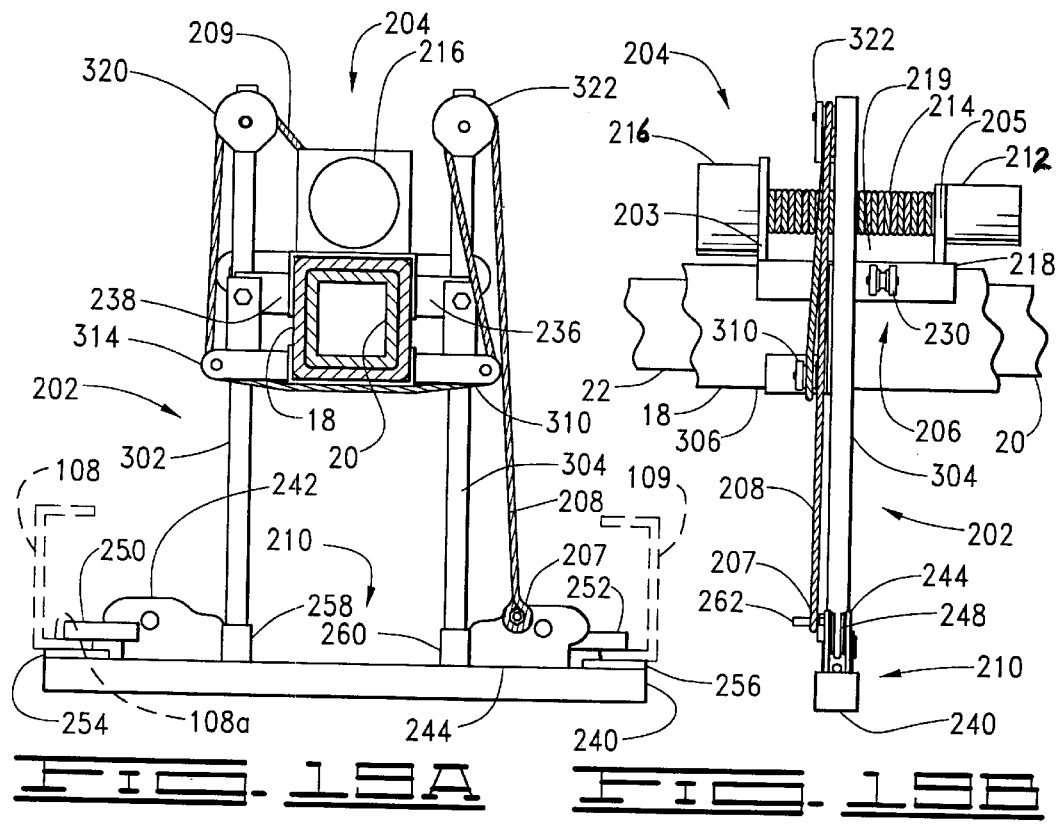
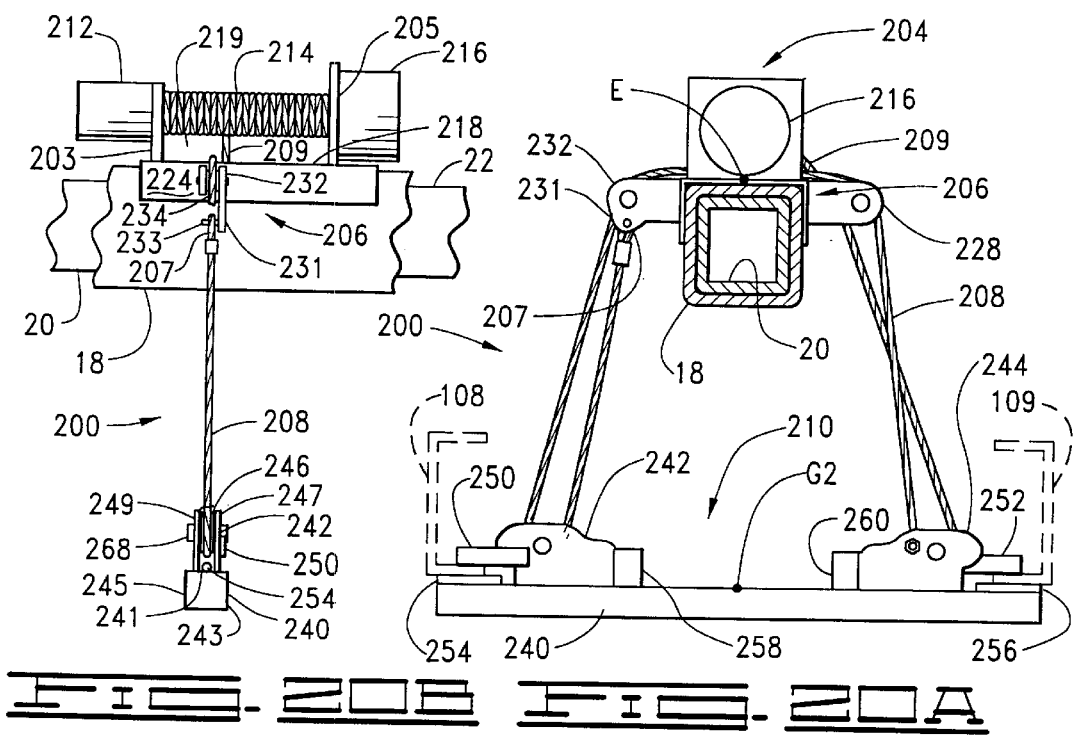
FIG. 19A  FIG. 19B
FIG. 20B  FIG. 20A

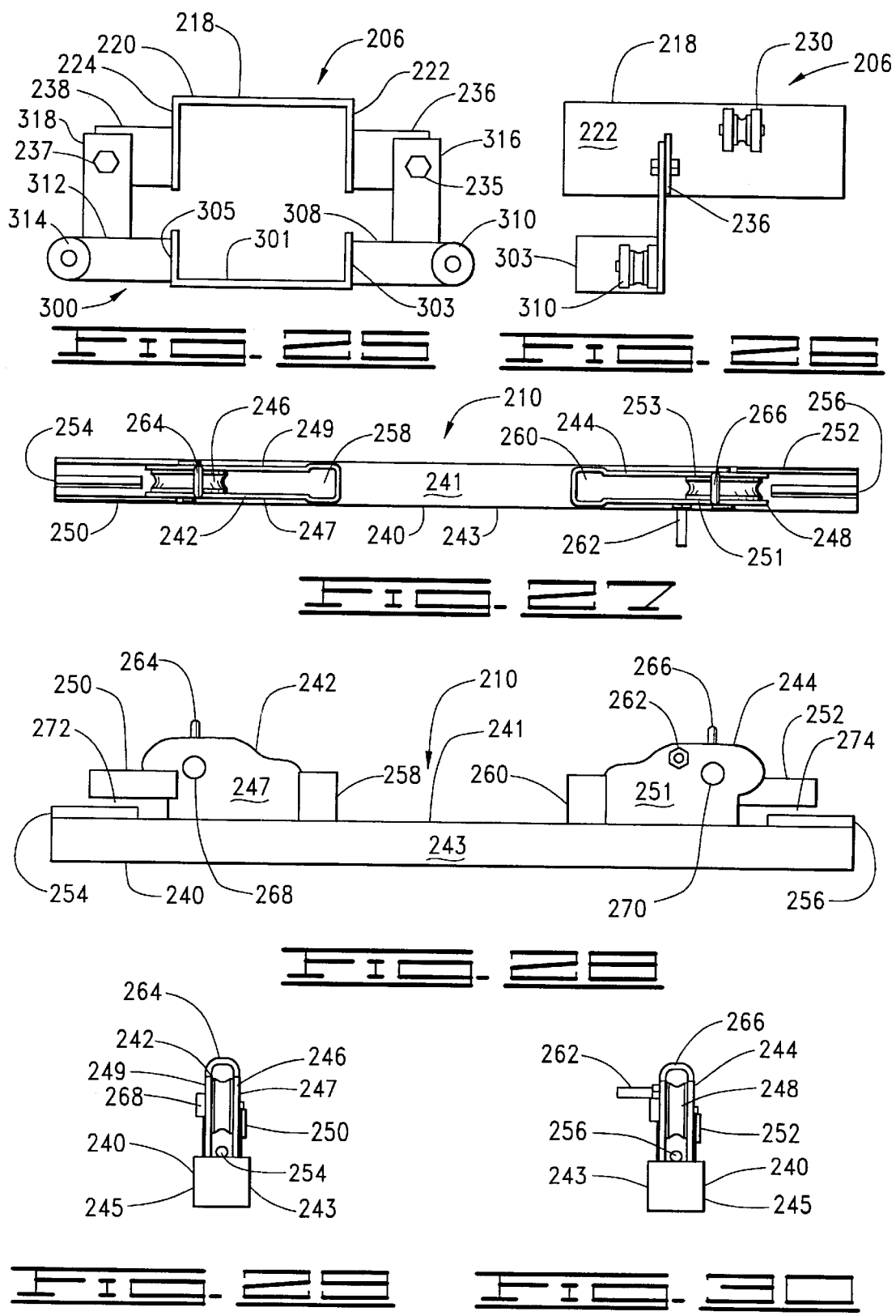

METHOD OF APPARATUS FOR LIFTING AND TOWING A LOAD

BACKGROUND OF THE INVENTION

1. Technical Field of the Invention

This invention broadly relates to an apparatus and to a method of using the apparatus to lift a load. The invention further relates to an apparatus and to a method of using the apparatus to transfer a portion of a load from a first supporting base to a second supporting base. The invention still further relates to an apparatus and to a method of using the apparatus to partially lift a load and then to push or pull the entire load. The invention more specifically relates to partially lifting a first vehicle utilizing a beam and a draw works in combination with a second vehicle and then using the beam to tow the partially lifted first vehicle with the second vehicle.

2. Description of the Prior Art and Problems Solved

Goods of all sizes and weights are commonly, and customarily, transported from one land location to another land location by means of wheeled vehicles. Such goods, in large measure, are placed in trailers. The trailers are then connected to motorized vehicles which then pull the trailers from place to place over suitable roadways. The trailers employed can be quite large. Consequently, the pulling vehicles are also quite large. The art recognizes such large motorized towing vehicles, sometimes called tractors, and has placed them in a special category and assigned to them the recognizable name, "semi tractors," or simply, "semis".

The employment of a semi tractor to haul a trailer is very popular and convenient until the tractor becomes disabled on a roadway. At that point, not only must the trailer being hauled by the disabled semi be hauled by another functioning semi, but also the disabled semi must itself be hauled to a suitable repair facility. In a sense, a disabled semi tractor has suffered a reversal of roles and has itself become a trailer to be hauled.

The art has recognized the challenge of towing disabled semi tractors by delegating the task of towing semi tractors to other semi tractors, referred to as wreckers, which have been specifically, and permanently, equipped with booms, gears and winches of size sufficient to partially lift the disabled vehicle from the supporting roadway to enable the wrecker to tow the thus lifted vehicle to a desirable facility.

The conversion of a semi tractor to the role of wrecker, by the permanent installation of lifting equipment, thereby dedicates it to that role and effectively eliminates the wrecker from the task of hauling trailers which contain goods. The art thus requires a method of, and an apparatus for, dispensing with the need of dedicating a semi tractor to the role of a wrecker.

This invention, accordingly. provides an apparatus and a method of using the apparatus which will enable, for example, any available semi tractor to partially lift and tow any other semi tractor to thereby eliminate the need of specifically dedicating a vehicle to limited use as a wrecker.

THE INVENTION

Disclosure of the Invention

This invention comprises an apparatus and a method of using the apparatus to partially lift a load. The expression, "to partially lift a load," means that a portion of the load is transferred from a first platform to a second platform while the balance of the load remains supported by at least a portion of the first platform. An example of a load to be partially lifted by the apparatus and method of this invention is a vehicle having at least one wheel on the front side and at least one wheel on the back side to support the weight of the vehicle on a base, such as the ground, wherein the wheel, or wheels, on the back side of the vehicle are lifted from the ground while the wheel, or wheels, on the front side of the vehicle remain on the ground, to thereby transfer a portion of the weight of the vehicle to a different support platform, such as to another vehicle.

The apparatus is broadly comprised of a beam and a draw works. The method of using the apparatus to partially lift a load requires the co-operation of the apparatus itself, the load to be lifted and a stationary base or platform. Subsequent to the lift, the beam element of the apparatus can be employed to push or pull the entire load from one location to another location.

The beam of this invention comprises a substantially linear central member, a first linear connecting member and a second linear connecting member. The linear central member has a top side, a bottom side, a right side, a left side, a first end and a second end and is, preferably, rectangular in cross section. The linear member, in one embodiment, can be in the form of an inverted "V", i.e., concave, to help support the load while still retaining the substantially linear character thereof. The first linear connecting member has a first distal end and a first proximal end. The second linear connecting member has a second distal end and a second proximal end.

The first linear connecting member is attached to, projects downwardly from and is substantially perpendicular to the bottom side of the linear central member. In this regard, the first proximal end of the first linear connecting member is rigidly, but removably, connected to the first end of the linear central member and extends downwardly from and substantially perpendicular to the bottom side thereof. The first distal end of the first linear connecting member is adapted for multidirectional rotation on, and removable attachment to, a first pivot which is a structural feature of the load to be lifted.

The second linear connecting member is attached to, projects downwardly from and is substantially perpendicular to the bottom side of the linear central member. In this regard, the second proximal end of the second linear connecting member is rigidly, but removably, connected to the second end of the linear central member and extends downwardly from and substantially perpendicular to the bottom side thereof. The second distal end of the second linear connecting member is adapted for multidirectional rotation on, and removable attachment to, a second pivot which is a structural feature of a stationary base.

In the preferred embodiment of this invention, the word "pivot," as used herein, refers to an axle positioned substantially parallel to the transverse axis of a body, but not necessarily intersecting the horizontal axis, i.e., the linear axis, of the body. Thus, the first pivot is a first axle positioned substantially parallel to the transverse axis of the load to be lifted, and the second pivot is a second axle positioned substantially parallel to the transverse axis of the mentioned stationary base which is employed in combination with the apparatus of the invention to lift the load. Accordingly, in this embodiment, the structure of the first distal end of the first linear connecting member functions to enable the linear central member of the beam of this invention to rotate around the first axle and to rotate around an axis which is perpendicular to the first axle. Similarly, the structure of the second distal end of the second linear connecting member functions to enable the linear central member of the beam of this invention to rotate around the second axle and to rotate around an axis which is perpendicular to the second axle. The rotations of the first distal end and the second distal end around the respective axles, as mentioned, occur simultaneously, in the same direction and through the same number of degrees. In this embodiment, each of the described axles is recognized in the art as an element of a "fifth wheel" and the distal end is broadly recognized in the art as a "king pin" and associated bearing support plate. This arrangement is recognized in the art as a "fifth wheel and king pin" connection.

In another embodiment, the word "pivot," as used herein, refers to a stationary ball vertically and rigidly mounted on a support ordinarily positioned substantially parallel to the horizontal, i.e., linear, axis of a body, wherein the distal end of the connecting member is adapted for multidirectional rotational attachment to the ball. This arrangement is recognized in the art as a "ball and socket connection."

The draw works, in a first embodiment of the invention, comprises a winch, a winch saddle and pulley system associated therewith, a flexible line, such as cable, having a free end and a winch end, and a traveling block having a pulley system, and a load contacting and load gripping means associated therewith. The draw works, when in the form of the first embodiment, is employed to partially lift a load, for example, the vehicle previously mentioned.

The draw works, in a second embodiment of the invention, is further comprised of a cradle block, and pulley system associated therewith, a first load supporting post, a second load supporting post and associated pulleys. The draw works, when in the form of the second embodiment, is employed to aid in the assembly of the beam of this invention and to aid in its connection to the vehicles.

The winch comprises a motor, gears and a flexible cable wound on a barrel adapted to rotate around an axis parallel to the linear axis of the linear central member. The winch is attached to and supported by the top surface of the winch saddle. The rotating barrel is preferably driven by an electric motor.

The winch saddle of the draw works is supported by and positioned on the top side of the linear central member of the beam at a point intermediate the first end of the linear central member and the second end of the linear central member.

The traveling block, in the first embodiment, is adapted for removable connection to a point on the load intermediate the first pivot and the second pivot at a location substantially vertically below the winch prior to lift.

In the second embodiment, the traveling block is adapted for removable connection to a stable support platform, such as the mentioned load, intermediate the first pivot and the second pivot at a location substantially vertically below the winch.

The first and second load supporting posts and associated pulleys are adapted for connection to and vertical support by the traveling block and for vertical support and vertical movement of the winch, winch saddle, cradle block and the beam.

The cradle block and pulley system associated therewith is supported by and adapted for removable attachment to the winch saddle.

The flexible line, when employed in the first embodiment of the draw works, connects the traveling block to the winch and winch saddle and, in co-operation with the first pivot and the second pivot, suspends the load and the traveling block below the bottom side of the linear central member of the beam.

The flexible line, when employed in the second embodiment of the draw works, connects the cradle block to the winch, the traveling block, the first and second load posts and, in co-operation with the first pivot, suspends the cradle block, the winch, the winch saddle and the beam from and below the support posts and above the traveling block.

In operation of the invention employing the draw works in the form of the first embodiment, the first distal end of the first linear connecting member is attached to the first pivot, the second distal end of the second linear connecting member is attached to the second pivot and the traveling block is attached to the load. Thereafter, the winch is activated to cause the cable to wind around the barrel of the winch to thereby decrease the distance between the winch and the traveling block. The net result is that the beam is caused to rotate on the first and second pivots, the winch, winch saddle and traveling block are lifted and the load is partially lifted and transferred to the stationary base.

In operation of the invention employing the draw works in the form of the second embodiment, the first distal end of the first linear connecting member is attached to the first pivot and the traveling block is attached to a stationary base, such as the load. Thereafter, the winch is activated to cause the cable to wind around the barrel of the winch to thereby decrease the distance between the cradle block and the top of the support posts. The net result is that the beam is caused to rotate on the first pivot, the winch, winch saddle, cradle block and the beam are lifted toward the top of the support posts and the weight of the winch, winch saddle, cradle block and the beam are partially transferred to the traveling block in preparation for attachment of the second distal end to the second pivot.

It is obvious, but important to expressly observe, that the traveling block does move in the first embodiment, but does not move in the second embodiment.

BRIEF DESCRIPTION OF THE DRAWINGS

FIG. 1 is a side view of two vehicles resting on a horizontal surface and linearly positioned end-to-end. The two vehicles are each equipped with one set of wheels positioned on the front end of each vehicle, two sets of wheels positioned on the rear end of each vehicle and an apparatus known in the art as a "fifth wheel" positioned intermediate the two sets of wheels on the rear end of each vehicle. The beam of this invention is linearly positioned intermediate the fifth wheels of the vehicles, wherein one end of the beam is removably connected to the fifth wheel of one of the vehicles and the opposite end of the beam is removably connected to the fifth wheel of the other vehicle. The vehicle depicted on the left side of FIG. 1 is in condition to be partially lifted.

FIG. 2 depicts the two vehicles of FIG. 1 connected by the beam of this invention at a time subsequent to lift, wherein the vehicle on the left side of FIG. 2 is shown to have been partially lifted and in condition to be pushed or pulled by the vehicle on the right side of FIG. 2.

FIG. 3 is an enlarged side view of the beam of this invention shown connected to the respective fifth wheels of the vehicles depicted in FIG. 1 in pre-lift position. A cross bar member is positioned on the beam transverse to the longitudinal axis thereof.

FIG. 4 is an enlarged side view of the beam of this invention shown connected to the respective fifth wheels of the vehicles depicted in FIG. 2 in post-lift and pre-tow position. The beam is shown prior to connection of the cross bar member to the vehicle to be towed which is depicted on the left side of FIG. 2.

FIG. 5 is a top view of FIGS. 3 and 4. FIG. 5 excludes and does not show the fifth wheels of FIGS. 3 and 4 to which the beam of this invention is removably connected.

FIG. 6 is an enlarged fragmentary side view of the first end of the beam of this invention and the fifth wheel to which it is connected as designated by the circled portion of FIG. 4 which is identified by the notation "FIG. 6."

FIG. 7 is an enlarged fragmentary side view of the second end of the beam of this invention and the fifth wheel to which it is connected as designated by the circled portion of FIG. 4 which is identified by the notation "FIG. 7."

FIG. 8 is a side view of the first linear connecting member of the beam of this invention which is employed to connect the first end of the beam to the fifth wheel as shown in FIG. 6.

FIG. 9 is an end view of the connecting member shown in FIG. 8.

FIG. 10 is the top view of the connecting member shown in FIG. 8.

FIG. 11 is a side view of the second linear connecting member of the beam of this invention which is employed to connect the second end of the beam to the fifth wheel as shown in FIG. 7.

FIG. 12 is an end view of the connecting member shown in FIG. 11.

FIG. 13 is the top view of the connecting member shown in FIG. 11.

FIG. 14 is a fragmentary sectional view of the side of the beam of this invention designated by the circled portion of FIG. 3 which is identified by the notation "FIG. 14" and taken in the direction of cut line 14—14 in FIG. 15.

FIG. 15 is a fragmentary view of the top of the beam of this invention designated by the circled portion of FIG. 5 which is identified by the notation "FIG. 15."

FIG. 15A is an end view of the cross bar member, the top view of which is shown in FIG. 15.

FIG. 16 is a cross sectional view of FIG. 15 and FIG. 15A taken in the direction of cut line 16—16.

" FIG. 18 also provides a schematic side view of the draw works of this invention (see FIGS. 20A and 20B, below) as employed to lift the vehicle (the first embodiment) shown on the left side of FIG. 2. Portions of FIG. 18 are drawn in phantom to indicate the presence of elements which ordinarily would not be shown in the view. Furthermore, elements which ordinarily would be shown in the view are not shown.

FIG. 19A is the front view of the configuration of the draw works of this invention in the second embodiment which is employed to lift the beam of this invention. The draw works, shown in operating position transverse to the longitudinal axis of the beam, is viewed from a point to the right of the schematic illustration of the draw works provided in FIG. 18 looking toward the vehicle shown on the left side of FIG. 2. Portions of FIG. 19A are shown in phantom. These portions do not form a part of the draw works but are provided to illustrate the connection of the draw works to a stationary base as employed in the operation of the draw works.

FIG. 19B is the right side view of FIG. 19A.

FIG. 20A is the front view of the configuration of the draw works of this invention in the first embodiment which is employed to lift the vehicle shown on the left side of FIG. 2. The draw works, shown in operating position transverse to the longitudinal axis of the beam, is taken in the direction of cut line 20—20 in FIG. 18. Portions of FIG. 20A are shown in phantom. These portions do not form a part of the draw works but are provided to illustrate the connection of the draw works to the load to be lifted.

FIG. 20B is the left side view of FIG. 20A.

FIG. 21 corresponds to the lift stage depicted in FIG. 1. FIG. 23 corresponds to the lift stage depicted in FIG. 2. FIG. 22 corresponds to the lift stage intermediate FIGS. 1 and 2 when the beam of this invention is in a horizontal position. FIG. 24 corresponds to the lift stage believed to be the theoretical maximum limit of the lift capable of being provided by the apparatus and method of this invention.

FIG. 25 is an enlarged front view of the beam contacting elements of the draw works of this invention comprised of a cradle block and a winch saddle employed in the configuration shown in FIGS. 19A and 19B.

FIG. 26 is the right side view of FIG. 25.

FIG. 27 is the top view of the traveling block of the draw works of this invention. The traveling block, as shown in the configuration shown in FIGS. 19A and 19B, does not move while the beam of this invention, but not the load (such as the vehicle shown on the left side of FIG. 2), is being lifted. In contrast, the traveling block, as shown in the configuration shown in FIGS. 18, 20A and 20B, is the specific load contacting element of the draw works of this invention and does move as the load is lifted.

FIG. 28 is the front view of the traveling block shown in FIG. 27.

FIG. 29 is the left side view of the traveling block shown in FIGS. 27 and 28.

FIG. 30 is the right side view of the traveling block shown in FIGS. 27 and 28.

DESCRIPTION OF THE PREFERRED EMBODIMENTS

Beam 2

Figure 17:
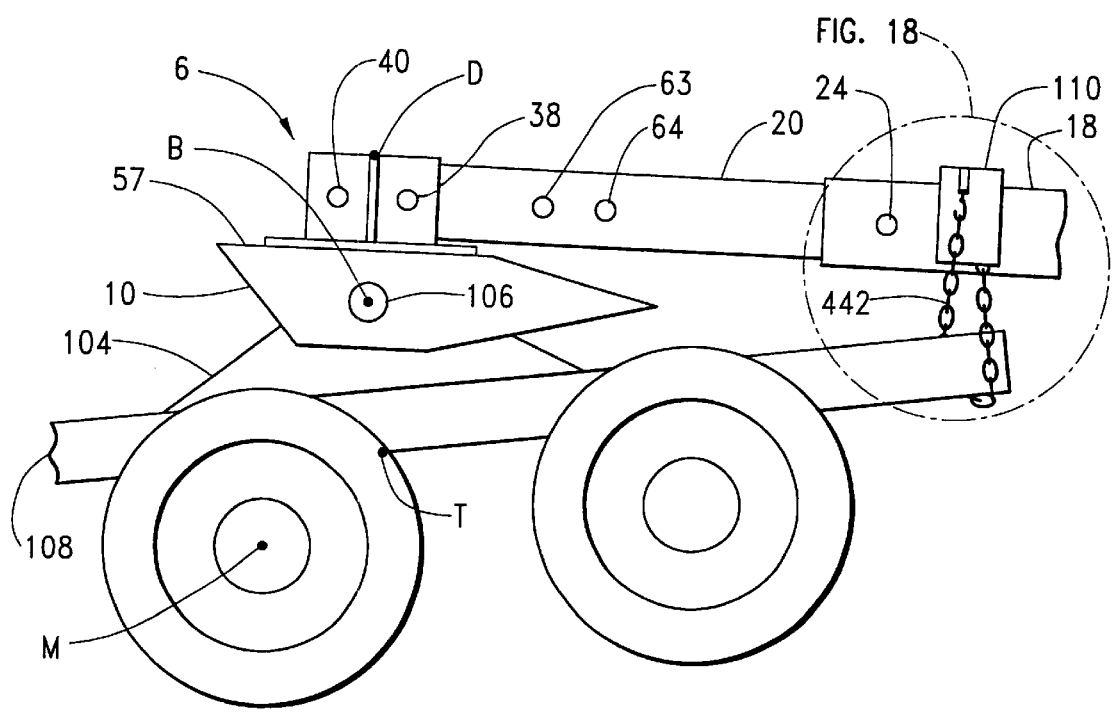
FIG. 17 is an enlarged fragmentary view of the left side of the beam of this invention and the fifth wheel and vehicle to which it is connected designated by the circled portion of FIG. 2 which is identified by the notation "FIG. 17."

Referring now to FIGS. 1–30, and particularly to FIGS. 1–18, combination lift and tow beam 2, is broadly comprised of linear member 4, first linear connecting member 6 and second linear connecting member 8. First end 4a of beam 2 is removably connected to fifth wheel 10 of vehicle 12 and second end 4b of beam 2 is removably connected to fifth wheel 14 of vehicle 16.

Linear Member 4

Linear member 4 is an elongated tube preferably having a rectangular cross section. In one preferred embodiment, linear member 4 comprises center link 18, having a hollow interior, a constant rectangular cross section, a first end and a second end; first end link 20, having a hollow interior, a constant rectangular cross section, a proximal end and a distal end; and second end link 22, having a hollow interior, a constant rectangular cross section, a proximal end and a distal end. Center link 18 is positioned intermediate first end link 20 and second end link 22, wherein the proximal end of first end link 20 is slidably inserted into the hollow interior of center link 18 at the first end thereof, and the proximal end of second end link 22 is slidably inserted into the hollow interior of center link 18 at the second end thereof. It is, thus, apparent that center link 18 is a hollow linear member, that it is open at both ends and that it sized, as shown in FIG. 14, to telescopically receive the proximal end of first end link 20 and to telescopically receive the proximal end of second end link 22.

The proximal end of first end link 20 is rigidly, but removably, fixed in the first end of center link 18 by pins 24 and 26. As seen, for example in FIG. 15, pins 24 and 26 extend from the exterior of the left side of center link 18 to the exterior of the opposite (right) side of center link 18 by penetrating corresponding holes, not shown, in the sides of first end link 20 and center link 18. The proximal end of second end link 22 is rigidly, but removably, fixed in the second end of center link 18 by pins 28 and 30. Also as seen in FIG. 15, pins 28 and 30 extend from the exterior of the left side of center link 18 to the exterior of the opposite (right) side of center link 18 by penetrating corresponding holes, not shown, in the sides of second end link 22 and center link 18.

Proximal end 21 of first end link 20 and proximal end 23 of second end link 22 are not in contact. Accordingly, gap 32 exists between proximal ends 21 and 23. The width of gap 32 is sufficient to prevent contact between proximal ends 21 and 23 during the assembly of beam 2 and the operation of the invention to lift a load. It is apparent that the mentioned holes in the side walls of center link 18 and end links 20 and 22 which receive pins 24, 26, 28 30 must be located to assure the existence of gap 32.

The length of first end link 20 is, preferably, less than the length of second end link 22 so that the distance from end 4a of linear member 4 to the first end of center link 18 is less than the distance from end 4b of linear member 4 to the second end of center link 18. The difference in the lengths of end links 20 and 22 operates to help assure placement of cross bar 110 and draw works 200 and 202 vertically above frame members 108 and 109 of vehicle 12 as seen, for example, in FIGS. 18 and 20A.

As shown in FIG. 6, the distal end of first end link 20 is rigidly, but removably, fixed in receiver 34 of first linear connecting member 6 by pins 38 and 40. Pins 38 and 40 extend from the exterior of the left side of receiver 34 to the exterior of the opposite (right) side of receiver 34 by penetrating corresponding holes, not shown, in the sides of first end link 20 and receiver 34. As shown in FIG. 7, the distal end of second end link 22 is rigidly, but removably, fixed in receiver 36 of second linear connecting member 8 by pins 42 and 44. Pins 42 and 44 extend from the exterior of the left side of receiver 36 to the exterior of the opposite (right) side of receiver 36 by penetrating corresponding holes, not shown, in the sides of second end link 22 and receiver 36.

The length of linear member 4 can be reduced by removably connecting end link 20 to receiver 34 as described above by employing holes 63 and 64 in combination with pins 40 and 38 and/or by employing holes 65 and 66 in combination with pins 42 and 44. It is understood that reducing the length of linear member 4 as described will necessarily result in diminishing the distance between the rear ends 13 and 15 of vehicles 12 and 16 as shown in FIGS. 1 and 2. In this regard a minimum separation between the rear ends of the two vehicles, such as the distance between point 13 on vehicle 12 and point 15 on vehicle 16, must be maintained to prevent contact between the vehicles during operation of the invention as described below.

The length of linear member 4 can also be reduced by moving fifth wheel 10 of vehicle 12 and/or fifth wheel 14 of vehicle 16 toward points 13 and 15 respectively, as known in the art, without necessarily diminishing the distance between point 13 and point 15. In this regard, however, prudent operation of vehicles of the type shown in FIGS. 1 and 2, when transporting a load on the fifth wheels, requires that the fifth wheels remain between the rear wheels of each vehicle. Thus, pivot point B, the transverse axis of rotation of fifth wheel 10, is preferably positioned intermediate wheels 67 and 68 of vehicle 12 and pivot point A, the transverse axis of rotation of fifth wheel 14, is preferably positioned between wheels 69 and 70 of vehicle 16.

Furthermore, any change in length of linear member 4 will change the distance between points C and D and points A and B, as shown for example in FIGS. 21–24, and, thus, will have an effect on the operation of the invention as influenced by the various angles defined below in parts D and E of Example 1.

Connecting Member 6

Referring more specifically to FIGS. 6, 8, 9 and 10, first linear connecting member 6 is comprised of receiver 34, left side support plate 46, right side support plate 48, bottom support plate 50 and king pin 52. King pin 52 is comprised of cylinder 54 and plate 56. In a preferred embodiment, first linear connecting member 6 is further comprised of handle 58 to facilitate the handling of connecting member 6.

Receiver 34 is a hollow linear member having a constant rectangular cross section. The rectangular cross section of receiver 34 is equal to the rectangular cross section of center link 18. As seen in FIGS. 3, 4, and 5, the vertical (height) dimension of receiver 34 is equal to the vertical (height) dimension of center link 18, and the transverse (width) dimension of receiver 34 is equal to the transverse (width) dimension of center link 18. Receiver 34 is rigidly connected, such as by weld beads, not shown, to the top surface 59 of bottom circular support plate 50, and positioned thereon such that the longitudinal (horizontal) axis of receiver 34 is in alignment with the diameter of plate 50 and the vertical axis of receiver 34 is perpendicular to bottom circular support plate 50 and in alignment with the vertical axis thereof.

Left side support plate 46, as seen in FIGS. 8 and 10, forms 90 degree angles with top surface 59 and with the left side surface of receiver 34 and is substantially triangular in shape. The height of plate 46 is a distance substantially equal to the perpendicular distance from top surface 59 of plate 50 to top surface 60 of receiver 34. The width of plate 46 is a distance substantially equal to the distance along a diameter of top surface 59 from the left side surface of receiver 34 to the outer edge of plate 50. The horizontal edge of support plate 46 is positioned in contact with top surface 59 along a diameter of plate 50. The vertical edge of support plate 46 is positioned intermediate the two holes in receiver 34 into which pins 38 and 40 are inserted, is in contact with the left side surface of receiver 34 and lies in a plane containing the vertical axis of receiver 34. Left side support plate 46 is rigidly connected, such as by weld beads, not shown, to the left side of receiver 34 and top surface 59 of bottom circular support plate 50.

A specific description of right side support plate 48 and its relationship to receiver 34, top surface 59 and plate 50 is not provided, because right side support plate 48 (with the obvious exceptions regarding references to the left and right sides of receiver 34) is equal in all respects to left side support plate 46.

King pin 52, as previously indicated, is comprised of cylinder 54 and circular plate 56. As seen in FIGS. 8 and 9, the longitudinal axis of cylinder 54 is perpendicular to plate 50 and is in alignment with the vertical axes of plate 50 and receiver 34. The top surface of cylinder 54 is in contact with bottom surface 61 of plate 50 and is rigidly attached thereto. As further seen in FIGS. 8 and 9, the vertical axis of circular plate 56, whose diameter is greater than the diameter of cylinder 54, is perpendicular to plate 50 and is in alignment with the vertical axes of plate 50 and receiver 34 and the longitudinal axis of cylinder 54. The bottom surface of cylinder 54 is in contact with top surface 62 of plate 56 and is rigidly attached thereto. The vertical distance between surface 61 and surface 62, and, thus, the length of cylinder 54, is a function of, and is at least equal to, the thickness of top surface 57 of fifth wheel 10. The relationship between first linear connecting member 6 and fifth wheel 10 is discussed below.

From the forgoing it is evident that first linear connecting member 6 is rigidly, but removably, connected to the distal end of first end link 20, and that the vertical axis of first linear connecting member 6, which is comprised of the coinciding vertical axes of receiver 34, plate 50, and plate 56, and the longitudinal axis of cylinder 54 is perpendicular to the longitudinal axis of first end link 20, and, therefore, of linear member 4. It is further evident that plate 50, cylinder 54 and plate 56 are positioned entirely below the bottom surface of first end link 20.

For purposes of explanation of the mechanism of the operation of the invention, which is provided below, point "D" represents the intersection of the vertical axis of first connecting member 6 with top surface 60 of receiver 34. Also for purposes of explanation of the mechanism of the operation of the invention, which is provided below, point "B" represents the intersection of the vertical axis of first linear connecting member 6 with the axis of rotation of fifth wheel 10. Point B is sometimes referred to as moving pivot B.

Connecting Member 8

Referring now to FIGS. 7, 11, 12 and 13, second linear connecting member 8 is comprised of receiver 36, base 72, first left side support plate 74, second left side support plate 76, first right side support plate 78, second right side support plate 80, bottom support plate 82 and king pin 84. King pin 84 is comprised of cylinder 86 and plate 88. In a preferred embodiment, first linear connecting member 8 is further comprised of handle 90 to facilitate the handling of connecting member 8.

Receiver 36 is a hollow linear member having a constant rectangular cross section. The rectangular cross section of receiver 36 is equal to the rectangular cross section of center link 18 and to the rectangular cross section of receiver 34. As seen in FIGS. 3, 4, and 5, the vertical (height) dimension of receiver 36 is equal to the vertical (height) dimension of center link 18, and the transverse (width) dimension of receiver 36 is equal to the transverse (width) dimension of center link 18. Base 72 is a hollow linear member having a constant rectangular cross section. Base 72 is equal to receiver to 36 in all physical dimensions, including cross section, height, width and length. Bottom surface 96 of base 72 is rigidly connected, such as by weld beads, not shown, to top surface 98 of bottom circular support plate 82 and positioned thereon such that the longitudinal (horizontal) axis of base 72 is in alignment with the diameter of plate 82 and the vertical axis of base 72 is perpendicular to bottom circular support plate 82 and is in alignment with the vertical axis thereof. Receiver 36, as seen in FIGS. 7, 11, 12 and 13, is oriented in connecting member 8 in a manner identical to that of base 72. Bottom surface 92 of receiver 36 is positioned on top surface 94 of base 72 such that all the corresponding edges of receiver 36 and base 72 are in alignment and rigidly attached together, such as by weld beads, not shown. Accordingly, the longitudinal (horizontal) axis of receiver 36 is in alignment with the diameter of plate 82 and the vertical axis of receiver 36 is perpendicular to bottom circular support plate 82 and in alignment with the vertical axis thereof.

First and second left side support plates 74 and 76, as seen in FIGS. 11 and 13, each form 90 degree angles with top surface 98 of plate 82 and with the left side surface of base 72 and each is substantially triangular in shape. The height of each of plates 74 and 76 is a distance substantially equal to the perpendicular distance from top surface 98 of plate 82 to top surface 94 of base 72. The width of each of plates 74 and 76 is a distance substantially equal to the distance along a chord of top surface 98 from the vertical edges of base 72 to the outer edge of plate 82 as shown in FIG. 13. The horizontal edge of each of support plates 74 and 76 is positioned in contact with top surface 98 along a chord of plate 82. The vertical edge of support plate 74 is positioned in contact with the left vertical edge, and the vertical edge of support plate 76 is positioned in contact with the right vertical edge, respectively, of the left side of base 72. Support plates 74 and 76 are rigidly connected, such as by weld beads, not shown, to the edges of base 72 and top surface 98 of bottom circular support plate 82.

A specific description of right side support plates 78 and 80 and their relationship to base 72, top surface 98 and plate 82 is not provided, because right side support plates 78 and 80 (with the obvious exceptions regarding references to the left and right sides of base 72) are equal in all respects to left side support plates 74 and 76.

King pin 84, as previously indicated, is comprised of cylinder 86 and plate 88. As seen in FIGS. 11 and 12, the longitudinal axis of cylinder 86 is perpendicular to plate 82 and is in alignment with the vertical axes of plate 82, base 72 and receiver 36. The top surface of cylinder 86 is in contact with bottom surface 100 of plate 82 and is rigidly attached thereto. As further seen in FIGS. 11 and 12, the vertical axis of plate 88, a circular plate whose diameter is greater than the diameter of cylinder 86, is perpendicular to plate 82 and coincides with the vertical axes of plate 82, base 72 and receiver 36 and the longitudinal axis of cylinder 86. The bottom surface of cylinder 86 is in contact with top surface 102 of plate 88 and is rigidly attached thereto. The vertical distance between surface 100 and surface 102, and, thus, the length of cylinder 86, is a function of, and is at least equal to, the thickness of top surface 73 of fifth wheel 14. The relationship between second connecting member 8 and fifth wheel 14 is discussed below.

From the forgoing it is evident that second linear connecting member 8 is rigidly, but removably, connected to the distal end of second end link 22, and that the vertical axis of second linear connecting member 8, which is comprised of the coinciding vertical axes of receiver 36, base 72, plate 82, and plate 88 and the longitudinal axis of cylinder 86 is perpendicular to the longitudinal axis of second end link 22, and, therefore, of linear member 4. It is further evident that base 72, plate 82, cylinder 86 and plate 88 are positioned entirely below the bottom surface of second end link 22.

For purposes of explanation of the mechanism of the operation of the invention, which is provided below, point "C" represents the intersection of the vertical axis of second linear connecting member 8 with top surface 112 of receiver 36. Also for purposes of explanation of the mechanism of the operation of the invention, which is provided below, point "A" represents the intersection of the vertical axis of second linear connecting member 8 with the transverse axis of rotation of fifth wheel 14. Point A is sometimes referred to as stationary pivot A.

Points A, B, C and D, referred to above and specifically shown in FIGS. 1–13 and 17, correspond to points A, B, C and D identified in FIGS. 21–24.

Fifth Wheels 10 and 14

Referring now to FIGS. 1, 2, 3, 4, 6 and 7, fifth wheels 10 and 14 are identical. Accordingly, fifth wheel 10 is rotatably connected to support member 104 by axle 106 which is positioned transverse to the longitudinal axis of vehicle 12. Support member 104 is longitudinally movably connected to the frame of vehicle 12. Moving pivot B, referred to above, is the center of rotation of axle 106. Top surface 57 of fifth wheel 10 supports first linear connecting member 6 by contact between top surface 57 and bottom surface 61 of plate 50. Fifth wheel 10 is equipped with a central vertical cavity which penetrates top surface 57. The vertical (longitudinal) axis of the cavity is perpendicular to, and intersects, axle 106. As is well known in the art, king pin 52 is rotatably inserted into, and removably maintained within, the central cavity by interaction, known in the art, between elements of fifth wheel 10 and the circular shaped slot produced by the combination of plate 50, cylinder 54 and plate 56. First linear connecting member 6 is, thus, enabled to rotate around the mentioned vertical axis of the mentioned cavity and is also enabled to rotate with axle 106 around point B. The co-operation of fifth wheel 10 and king pin 54, accordingly, facilitates multidirectional rotation of connecting member 6.

A description of fifth wheel 14, with the exception of specific reference numerals, would be identical to that of fifth wheel 10. Accordingly, a specific description of fifth wheel 14 is not provided.

Draw Works

Continuing to refer to FIGS. 1–30, and particularly to FIGS. 18–20 and 25–30, the draw works of this invention are broadly comprised of embodiment 200, shown in FIGS. 20A and 20B, and embodiment 202, shown in FIGS. 19A and 19B. Embodiment 200 is also shown in schematic format in FIG. 18.

Draw Works 200

Draw works 200, employed in the first embodiment of this invention, is comprised of winch 204, winch saddle 206, a flexible line, such as cable 208, having free end 207 and winch end 209, and traveling block 210 having a pulley system, and a load contacting and load gripping means associated therewith.

Referring more specifically to FIGS. 19A, 19B, 20A and 20B, winch 204 is comprised of reversible electric motor 212, barrel 214 (sometimes referred to in the art as a "cable drum") and gear assembly 216. As shown, barrel 214 is positioned intermediate motor 212 and gear assembly 216 and is rotationally connected to each. Cable 208 is wrapped around barrel 214. As is known in the art, rotation of barrel 214, under the influence of motor 212 and gear assembly 216, causes cable 208 to wind or unwind from barrel 214 to raise or lower a load. Winch 204 operates to hold a load in place upon termination of rotation of barrel 214. A winch particularly preferred for use herein is disclosed in U.S. Pat. No. 5,398,923 to Perry et al.

An electric motor particularly useful herein operates on a 12-volt, direct current battery of the type ordinarily employed in vehicles 12 and 16 of FIGS. 1 and 2.

Barrel supports 203 and 205 of winch 204 are rigidly attached to upper surface 218 of winch saddle 206 such that the longitudinal axis of barrel 214 is parallel to the longitudinal axis of linear member 4. Gap 219 is formed between upper surface 218 and barrel 214 having cable 208 wrapped thereon.

Figure 18:
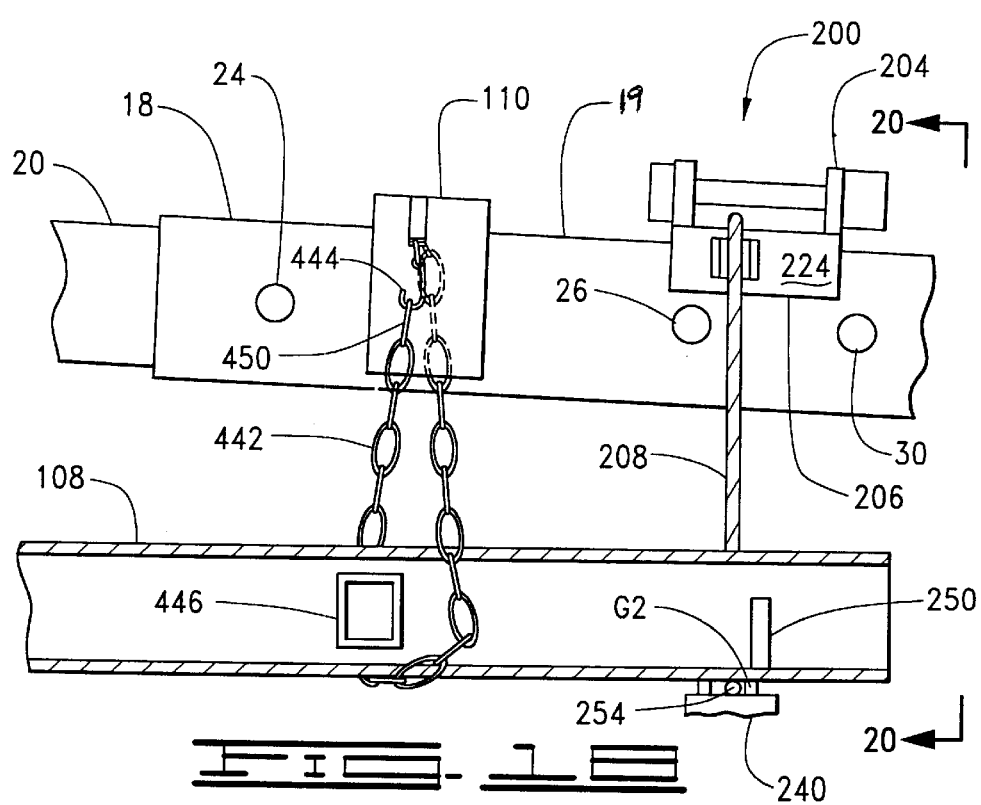
FIG. 18 is an enlarged fragmentary sectional view of the left side of the beam of this invention and the vehicle to which it is connected as designated by the circled portion of FIG. 17 which is identified by the notation "FIG. 18.

Winch saddle 206, as shown in FIGS. 25 and 26, is comprised of top plate 220, right side plate 222 and left side plate 224. Side plate 222 is perpendicular to top plate 220 having a longitudinal edge thereof rigidly attached to the right longitudinal edge of top 220. Side plate 224 is perpendicular to top plate 220 having a longitudinal edge thereof rigidly attached to the left longitudinal edge of top 220. Top 220 and sides 222 and 224 form an inverted "U" shaped form whose internal width is sufficiently greater than the external width of central link 18 to enable winch saddle 206, having winch 204 attached thereto as described, to be slidably supported on top surface 19 of center link 18 as shown, for example, in FIG. 18. Accordingly, the width of each of sides 222 and 224 is adjusted to enable winch saddle 206 to slide along top surface 19 and avoid contact with pins 26 and 30 as shown in FIG. 18.

As seen in FIG. 20A, ear 228 is rigidly attached to, and perpendicularly projects outwardly from, side 222 of winch saddle 206. Pulley 230 is rotatably attached to the distal end of ear 228. The axis of rotation of pulley 230 is parallel to the longitudinal axis of barrel 214.

Also as seen in FIG. 20A ear 232 is rigidly attached to, and perpendicularly projects outwardly from, side 224 of winch saddle 206. Pulley 234 is rotatably attached to the distal end of ear 232. The axis of rotation of pulley 234 is parallel to the longitudinal axis of barrel 214. The distal end of ear 232 also includes downwardly extending lobe 231 which is positioned vertically below pulley 234. Pin 233, shown in FIG. 20B, is positioned vertically below pulley 234, is rigidly attached to, and perpendicularly projects outwardly from, lobe 231 in the direction of linear connecting member 6.

Ear 236, like ear 228, is rigidly attached to, and perpendicularly projects outwardly from, side 222 of winch saddle 206. Ear 238, like ear 232, is rigidly attached to, and perpendicularly projects outwardly from, side 224 of winch saddle 206. Ear 236 is penetrated by a hole, not shown, adjacent the outer edge thereof, into which is inserted bolt 235. Ear 238 is penetrated by a hole, not shown, adjacent the outer edge thereof, into which is inserted bolt 237. Ear 236 and 238 are deliberately not shown in FIGS. 18, 20A, and 20B and are shown only in FIGS. 19A, 25 and 26. Ears 236 and 238 will be further discussed in connection with draw works 202.

Traveling block 210 comprises linear bar 240, left pulley support housing 242, right pulley support housing 244, left pulley 246, right pulley 248, left grip bar 250, right grip bar 252, left grip rod 254, right grip rod 256, left post pocket 258, right post pocket 260 and pin 262.

Referring more specifically now to FIGS. 27–30, linear bar 240 is preferably rectangular in cross section having a top surface 241, a front surface 243 and a back surface 245.

Left support housing 242 is comprised of front plate 247 and back plate 249. Plates 247 and 249 are substantially identical in size and shape wherein each is flat, generally rectangular and has a curvilinear distal end, a linear proximal end and a linear bottom edge. Plates 247 and 249 are positioned side-by-side, in alignment and transversely spaced apart on top surface 241 of linear bar 240 to produce a gap there between. Each of plates 247 and 249 is perpendicular to surface 241 with the linear bottom edge of each positioned parallel to the longitudinal axis of linear bar 240 and rigidly attached thereto by weld beads, not shown. The proximal end of each of plates 247 and 249 is positioned intermediate the center of bar 240 and the left end of bar 240 so that the distal end of each of plates 247 and 249 is also positioned intermediate the center of bar 240 and the left end of bar 240. The top edges of plates 247 and 249 are connected by bar 264 which is positioned transverse to the longitudinal axis of bar 240.

Right support housing 244 is comprised of front plate 251 and back plate 253. Plates 251 and 253 are substantially identical in size and shape wherein each is flat, generally rectangular and has a curvilinear distal end, a linear proximal end and a linear bottom edge. Plates 251 and 253 are positioned side-by-side, in alignment and transversely spaced apart on top surface 241 of linear bar 240 to produce a gap there between. Each of plates 251 and 253 is perpendicular to surface 241 with the linear bottom edge of each positioned parallel to the longitudinal axis of linear bar 240 and rigidly attached thereto by weld beads, not shown. The proximal end of each of plates 251 and 253 is positioned intermediate the center of bar 240 and the right end of bar 240 so that the distal end of each of plates 251 and 253 is also positioned intermediate the center of bar 240 and the right end of bar 240. The top edges of plates 251 and 253 are connected by bar 266 which is positioned transverse to the longitudinal axis of bar 240.

The distance of the proximal ends of plates 251 and 253 from the center of bar 240 is equal to the distance of the proximal ends of plates 247 and 249 from the center of bar 240.

Left pulley 246 is positioned in the gap between the distal ends of plates 247 and 249 of left pulley support housing 242, wherein the axis of rotation of pulley 246 is transverse to the longitudinal axis of bar 240 and the outer circumferential edges of pulley 246 do not extend beyond the curvilinear edges of plates 247 and 249. Left pulley 246 is supported in housing 242 by horizontal axle 268. A gap is created between surface 241 and the outer circumferential edge of pulley 246.

Right pulley 248 is positioned in the gap between the distal ends of plates 251 and 253 of right pulley support housing 244, wherein the axis of rotation of pulley 248 is transverse to the longitudinal axis of bar 240 and the outer circumferential edges of pulley 248 do not extend beyond the curvilinear edges of plates 251 and 253. Right pulley 248 is supported in housing 248 by horizontal axle 270. A gap is created between surface 241 and the outer circumferential edge of pulley 248.

Left grip rod 254 is a linear, solid, cylindrical rod having a distal end and a proximal end. Rod 254 is rigidly attached, such as by welding beads, not shown, to surface 241 of bar 240. Rod 254 is positioned in the center of surface 241, with the linear axis parallel to the linear axis of bar 240. As shown in FIG. 28, the distal end of rod 254 is in alignment with the left side of bar 240 and the proximal end of rod 254 is in substantial vertical alignment with the aligned curvilinear edges of plates 247 and 249.

Right grip rod 256 is a linear, solid, cylindrical rod having a distal end and a proximal end. Rod 256 is rigidly attached, such as by welding beads, not shown, to surface 241 of bar 240. Rod 256 is positioned in the center of surface 241, with the linear axis parallel to the linear axis of bar 240. As shown in FIG. 28, the distal end of rod 256 is in alignment with the right side of bar 240 and the proximal end of rod 256 is in substantial vertical alignment with the aligned curvilinear edges of plates 251 and 253.

Left grip bar 250, is a solid flat strap having a rectangular cross section. A portion of a flat side of bar 250 is rigidly attached, such as by welding beads, not shown, to the outer surface of plate 247 adjacent to the distal end of plate 247 such that the remaining portion of bar 250 extends horizontally outwardly from plate 247 over surface 241, but not beyond the left side of bar 240. Gap 272 is formed between the bottom edge of bar 250 and rod 254. Because bar 250 is attached to the outer surface of plate 247 adjacent to front surface 243 of bar 240 and rod 254 is positioned in the center of bar 240, it is evident that bar 250 is not placed directly above rod 254.

Right grip bar 252, is a solid flat strap having a rectangular cross section. A portion of a flat side of bar 252 is rigidly attached, such as by welding beads, not shown, to the outer surface of plate 253 adjacent to the distal end of plate 253 such that the remaining portion of bar 252 extends horizontally outwardly from plate 253 over surface 241, but not beyond the right side of bar 240. Gap 274 is formed between the bottom edge of bar 252 and rod 256. Because bar 252 is attached to the outer surface of plate 253 adjacent to back surface 245 of bar 240 and rod 256 is positioned in the center of bar 240, it is evident that bar 252 is not placed directly above rod 256.

Notice that gaps 272 and 274 are not in alignment; they are staggered. In this regard, gap 272 is adjacent to front surface 243 of bar 240 but gap 274 is adjacent to back surface 245 of bar 240.

Left post pocket 258, as shown in FIGS. 27 and 28, is a vertically oriented cylinder having a rectangular cross section, a hollow interior and an open top. The left vertical surface of pocket 258 is rigidly attached, such as by welding beads, not shown, to the proximal ends plates 247 and 249 of left support housing 242 and the bottom surface of post pocket 258 is rigidly attached, such as by welding beads, not shown, to surface 241. As shown in FIG. 19A, left post pocket 258 is positioned substantially directly vertically below bolt 237 in ear 238 of winch saddle 206.

Right post pocket 260, as shown in FIGS. 27 and 28, is a vertically oriented cylinder having a rectangular cross section, a hollow interior and an open top. The right vertical surface of pocket 260 is rigidly attached, such as by welding beads, not shown, to the proximal ends plates 251 and 253 of right support housing 244 and the bottom surface of post pocket 260 is rigidly attached, such as by welding beads, not shown, to surface 241. As shown in FIG. 19A, right post pocket 260 is positioned substantially directly vertically below bolt 235 in ear 236 of winch saddle 206.

Post pockets 258 and 260 are further discussed in connection with draw works 202.

Pin 262, shown in FIGS. 19B, 27, 28 and 30, is rigidly attached to, and perpendicularly projects outwardly from, the upper portion of the outside surface of plate 251 in the direction of linear connecting member 8. Pin 262 is positioned intermediate axle 270 and right post pocket 260. Pin 262 is further discussed in connection with draw works 202.

Referring to FIGS. 20A and 20B, cable 208, when employed in draw works 200, passes from the underside of barrel 214 to the outside of pulley 248 of right pulley support housing 244. Cable 208 thereafter passes around pulley 248 and then passes from the inside of pulley 248 to the outside of pulley 230 which is rotatably attached to the distal end of ear 228. Thereafter, cable 208 passes over the top of pulley 230 and through gap 219 between upper surface 218 and barrel 214 to the top of pulley 234 which is rotatably attached to the distal end of ear 232. Cable 208 then passes over the top of pulley 234 and to the outside of pulley 246 of left pulley support housing 242. Cable 208 thereafter passes around pulley 246 and then passes from the inside of pulley 246 to lobe 231 of distal end of ear 232. Upon reaching lobe 231, free end 207 of cable 208, a closed loop, is fitted over pin 233.

In view of this description of draw works 200, notice that cable 208, in its operative path, begins with winch end 209, which is effectively connected to winch saddle 206, and ends with free end 207, which is also attached to winch saddle 206. Further in view of this description of draw works 200, it is clear that rotation of barrel 214 by motor 212 and gear assembly 216 to wind cable 208 around barrel 214 operates to reduce the length of cable 208 between pulley 230 and pin 233 with the necessary result that traveling block 210 is caused to move toward winch saddle 206. Accordingly, the distance between point $G_2$ on bar 240 and point E on winch saddle 206 is diminished as the length of cable 208 is reduced.

Draw Works 202

Draw works 202, employed in the second embodiment of this invention, is comprised of winch 204, winch saddle 206, a flexible line, such as cable 208, having free end 207 and winch end 209, traveling block 210 having a pulley system, and a load contacting and load gripping means associated therewith, cradle block 300, and pulley system associated therewith, left load support post 302 and right load support post 304.

Descriptions of winch 204, winch saddle 206, cable 208 and traveling block 210 are provided above in connection with draw works 200 and applies with equal facility to draw works 202.

Cradle block 300, as shown in FIGS. 25 and 26, is comprised of bottom plate 301, right side plate 303 and left side plate 305. Side plate 303 is perpendicular to bottom plate 301 having a longitudinal edge thereof rigidly attached to the right longitudinal edge of bottom plate 301. Side plate 305 is perpendicular to bottom plate 301 having a longitudinal edge thereof rigidly attached to the left longitudinal edge of bottom plate 301. Bottom plate 301 and sides 303 and 305 produce a "U" shaped form whose internal width is sufficiently greater than the external width of central link 18 to enable cradle block 300 to slidably contain bottom surface 306 of center link 18 as shown in FIG. 19B. Accordingly, the width of each of sides 303 and 305 is adjusted to enable cradle block 300 to slide along bottom surface 306 and avoid contact with pins 26 and 30.

As seen in FIG. 25 ear 308 is rigidly attached to, and perpendicularly projects outwardly from, side 303 of cradle block 300. Pulley 310 is rotatably attached to the distal end of ear 308. The axis of rotation of pulley 310 is parallel to the longitudinal axis of barrel 214. Also as seen in FIG. 25, ear 312 is rigidly attached to, and perpendicularly projects outwardly from, side 305 of cradle block 300. Pulley 314 is rotatably attached to the distal end of ear 312. The axis of rotation of pulley 314 is parallel to the longitudinal axis of barrel 214. Ear 316 is rigidly attached to, and perpendicularly projects upwardly from, ear 308 of cradle block 300. Ear 318 is rigidly attached to, and perpendicularly projects upwardly from, ear 312 of cradle block 300. Ear 316 is penetrated by a hole, not shown, adjacent the outer edge thereof, into which is inserted bolt 235 which functions to fasten ear 316 to ear 236 of winch saddle 206. Ear 318 is penetrated by a hole, not shown, adjacent the outer edge thereof, into which is inserted bolt 237 which functions to fasten ear 318 to ear 238 of winch saddle 206.

From the above it is clear that cradle block 300 is suspended beneath winch saddle 206 and that cradle block 300 and winch saddle 206 combine to surround and support beam 2 as shown in FIGS. 19A and B.

Pulley 320 is rotatably attached to the upper end of left load support post 302, an elongated member, whose lower end is adapted for insertion into the hollow interior of left post pocket 258, which, as previously disclosed, is a vertically oriented cylinder having a rectangular cross section, a hollow interior and an open top. The axis of rotation of pulley 320 is parallel to the longitudinal axis of barrel 214.

Pulley 322 is attached to the upper end of right load support post 304, an elongated member, whose lower end is adapted for insertion into the hollow interior of right post pocket 260, which, as previously disclosed, is a vertically oriented cylinder having a rectangular cross section, a hollow interior and an open top. The axis of pulley 322 is parallel to the longitudinal axis of barrel 214. In a preferred embodiment pulley 322 does not rotate, but merely provides a stationary curvilinear surface.

The lengths of posts 302 and 304, measured to the bottom of pulley 320 and pulley 322, are substantially identical and, when employed in the operation described below, are at least equal to the vertical distance from upper surface 241 of bar 240 of traveling block 210 to a horizontal line through point C of connecting member 8 as shown mounted on fifth wheel 14 of vehicle 16 in FIG. 1.

Referring to FIGS. 19A and 19B, cable 208, when employed in draw works 202, passes from the topside of barrel 214 to the inside of pulley 320 of left load support post 302. Cable 208 thereafter passes over the top of pulley 320 and then passes from the outside of pulley 320 to the outside of pulley 314, which is rotatably attached to the distal end of ear 312. Thereafter, cable 208 passes around the outside of pulley 314 and then passes from the underside of pulley 314 to the underside of pulley 310, which is rotatably attached to the distal end of ear 308, by passing under the bottom surface of cradle block 300. Cable 208 then passes under cable 310 and then passes from the outside of pulley 310 to the inside of pulley 322 of right load support post 304. Cable 208 thereafter passes over the top of pulley 322 and then passes from the outside of pulley 322 to plate 251 of traveling block 210. Upon reaching plate 251, free end 207 of cable 208, a closed loop, is fitted over pin 262.

In view of this description of draw works 202, notice that cable 208, in its operative path, begins with winch end 209, which is effectively connected to winch saddle 206, and ends with free end 207, which is attached to traveling block 210. Further in view of this description of draw works 202, it is clear that rotation of barrel 214 by motor 212 and gear assembly 216 to wind cable 208 around barrel 214 operates to reduce the length of cable 208 between pulley 322 and pulley 320 with the necessary result that cradle block 300 is caused to move toward pulleys 322 and 320.

Cross Bar 110

Referring to FIGS. 2–5, and 14–18, cross bar 110 is shown slidably supported on top surface 19 of center link 18 of linear member 4. The linear axis of cross bar 110 is positioned transverse to the linear axis of linear member 4, wherein about one-half of the length of cross bar 110 projects to the left of the linear axis of linear member 4 and about one-half of the length of cross bar 110 projects to the right of the linear axis of linear member 4.

Referring more specifically to FIGS. 15, 15A and 16, cross bar 110 is comprised of box members 401 and 403. Each such box member has a hollow interior, a constant rectangular cross section and each is substantially identical in size and shape to the other. Box members 401 and 403 are positioned end-to-end, but are axially separated apart, as described below, so that the proximal end of member 401 is not in contact with the proximal end of member 403.

The distal end of member 401 is closed by left end plate 406 and the distal end of member 403 is closed by right end plate 408. The left front side of cross bar 110 is closed by left front plate 422 of box member 401 and the right front side of cross bar 110 is closed by right front plate 424 of box member 403. The left back side of cross bar 110 is closed by left back plate 418 of box member 401 and the right back side of cross bar 110 is closed by right back plate 420 of box member 403. The left bottom side of cross bar 110 is closed by left bottom plate 402 of box member 402 and the right bottom side of cross bar 110 is close by right bottom plate 404 of box member 403.

The distal end of member 401 terminates at a point substantially vertically above frame member 108 of vehicle 12 and the distal end of member 403 terminates at a point substantially vertically above frame member 109 of vehicle 12. It is, accordingly, clear that the length of cross bar 110 is approximately equal to the distance between frame members 108 and 109 of vehicle 12.

The axial separation of box members 401 and 403 is maintained by plate 400. In this regard, the outer surfaces of top plates 410 and 412 of members 401 and 403 are rigidly connected by weld beads, not shown, to the bottom surface of plate 400. The distal ends of members 401 and 403 are in alignment with the opposite ends of plate 400. Accordingly, the distance between the proximal ends of members 401 and 403 is equal to the difference between the length of plate 400 and the sum of the lengths of members 401 an 403. The width of plate 400 is equal to the width of each of members 401 and 403.

More specifically, the minimum distance between the proximal ends of members 401 and 403 is the distance between the left outside surface and the right out side surface of center link 18 to thereby enable cross bar 110 to slide along surface top 19 of central link 18 without being obstructed by the proximal ends of members 401 and 403. The maximum separation between the proximal ends of members 401 and 403 is the distance between the outside surfaces of the pins, such as pins 24, 26, 28 and 30, which connect center link 18 to end links 20 and 22.

It will become apparent from the description provided below, that a substantial portion of the weight of vehicle 12 lifted by the apparatus of this invention will be transmitted to distal ends 401 and 403 of cross bar 110. Accordingly, plate 400 will be subjected to bending stresses at the intersection of plate 400 and the vertical outside surfaces of center link 18. It is preferred, therefore, that the mentioned bending stresses be resisted by the proximal ends of members 401 and 403. To provide the desired resistance, the mentioned minimum distance between the proximal ends of members 401 and 403 is employed above pins 24, 26, 28 and 30, and the mentioned maximum distance between the proximal ends of members 401 and 403 is employed thereafter. Such an arrangement produces slots 426 and 428 as shown in FIG. 16.

Vertical hole 430 penetrates plate 400 and top plate 410 and vertical hole 432 penetrates bottom plate 402. The axes of holes 430 and 432 are in vertical alignment and are identical in diameter. The holes provide access to the hollow interior of cross bar 110 to thereby enable communication from the top of cross bar 110 to the bottom of cross bar 110 through the hollow interior thereof. Slot 438 is cut into plate 406 along a radius of hole 430 and intersects hole 430. The width of slot 438 is equal to or just slightly greater than the thickness of an individual link of a chain, but decidedly less than the width of an individual link in a chain, such as chain 442, to thereby obstruct and otherwise prevent successive links of chain, as seen in FIG. 18, from sliding through slot 438. The free end of chain 442, not shown, is introduced into the hollow interior of cross bar 110 through hole 430 and withdrawn from the hollow interior of cross bar 110 through hole 432. A link of chain 442 adjacent hook end 444 is fitted in slot 438 so that hook end 444 is suspended from slot 438 on the exterior of plate 406 and chain 442 is prevented from sliding through the holes 430 and 432.

Vertical hole 434 penetrates plate 400 and top plate 412 and vertical hole 436 penetrates bottom plate 404. The axes of holes 434 and 436 are in vertical alignment and are identical in diameter. The holes provide access to the hollow interior of cross bar 110 to thereby enable communication from the top of cross bar 110 to the bottom of cross bar 110 through the hollow interior thereof. Slot 440 is cut into plate 408 along a radius of hole 434 and intersects hole 434. The width of slot 440 is equal to or just slightly greater than the thickness of an individual link of a chain, but decidedly less than the width of an individual link in a chain, such as chain 442*a*, not shown, to thereby obstruct and otherwise prevent successive links of chain from sliding through slot 440. The free end of chain 442*a*, not shown, is introduced into the hollow interior of cross bar 110 through hole 434 and withdrawn from the hollow interior of cross bar 110 through hole 436. A link of chain 442*a* adjacent hook end 448, not shown, is fitted in slot 440 so that hook end 448 is suspended from slot 440 on the exterior of plate 408 and chain 442*a* is prevented from sliding through the holes 434 and 436.

To assist in the handling of cross bar 110, handles 414 and 416 are rigidly connected to plate 400 at a points above members 401 and 403, respectively, intermediate central link 18 and plates 406 and 408, respectively.

OPERATION OF THE INVENTION

Summary Description of Operation

The operation of the invention proceeds in three distinct phases. In phase one, the beam of this invention is assembled and connected to vehicles 12 and 16 to produce the condition shown in FIG. 1. In phase one, draw works 202, as shown in FIGS. 19A and 19B are employed. Draw works 202 has been described as employed in the second embodiment of this invention.

In phase two, the beam of this invention, in cooperation with vehicles 12 and 16, and draw works 200 operate to produce the condition illustrated in FIG. 18, which is the precursor to the condition illustrated in FIGS. 2 and 17. In phase two, draw works 200, as shown in FIGS. 20A and 20B are employed. Draw works 200 has been described as employed in the first embodiment of this invention.

In phase three, vehicle 16 is enabled by the beam of this invention to push or pull vehicle 12. This condition is illustrated in FIGS. 2 and 17.

A fourth phase of the invention begins at the close of phase three wherein phases one and two are performed in reverse sequence in order to disconnect vehicles 12 and 16.

In the performance of phase one, beam 2 is assembled and connected to fifth wheels 10 and 14. The preferred method of performing phase one is as follows: Connecting member 6 is first mounted on fifth wheel 10 and first end link 20 is then attached to connecting member 6 as previously described. First end link 20 is temporarily supported on a beam laid across frame members 108 and 109 of vehicle 12 at a point intermediate pin position 24 and pin position 64, then center link 18 is slid over the proximal end of first end link 20 and attached to end link 20 as previously described.

Figure 21:
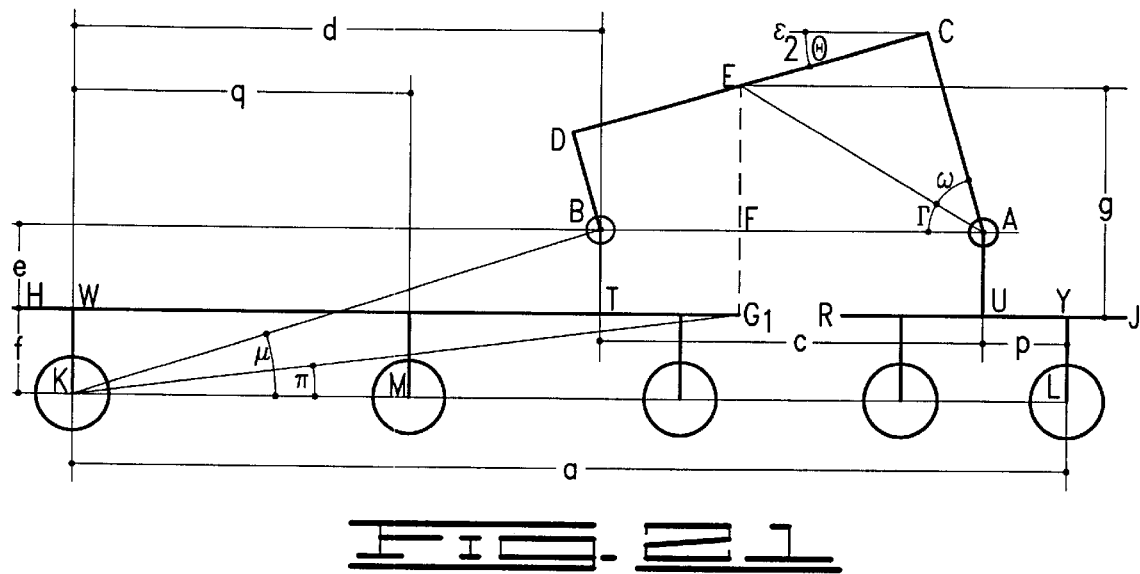
FIGS. 21, 22, 23 and 24 are schematic drawings of various specific stages of the lift sequence experienced during performance of the first embodiment of this invention to lift a load, such as the vehicle depicted on the left side of FIG. 2, in cooperation with a stationary base, such as the vehicle depicted on the right side of FIG. 2.

Draw works 202 (FIGS. 19A and 19B) is then mounted on center link 18 by first connecting traveling block 210 to vehicle 12 followed by assembly of the balance of draw works 202 as previously described. Lower flange 108a of frame member 108 is first inserted into gap 272 and the corresponding lower flange of frame member 109 is inserted into gap 274 of traveling block 210 to thereby connect traveling block 210 to vehicle 12. The position of traveling block 210 between the mentioned flanges is then adjusted so that the linear axis of traveling block 210 is substantially perpendicular to the linear axis of vehicle 12. Winch saddle 206, having winch 204 attached thereto, is placed on upper surface 19 of center link 18 at a point vertically above traveling block 210. In this position, as seen in FIG. 21, point E is substantially vertically above point $G_1$. The balance of draw works 202 is then assembled as previously described. Electric motor 212 is then connected to a source of direct current, such as the battery of vehicle 12, and winch 204 is activated to raise center link 18 and end link 20 by an amount sufficient to enable removal of the temporary beam support mentioned above. It is evident that activation of winch 204 as just mentioned causes center link 18, end link 20, connecting member 6 and fifth wheel 10 to rotate around pivot B in a counter clock wise direction. Vehicle 12, traveling block 210 and support posts 302 and 304 do not move.

The proximal end of end link 22 is then inserted into center link 18 and connected thereto and connecting member 8 is connected to end link 22 as described to thereby complete the assembly of beam 2. Vehicle 16 is then positioned as shown in FIG. 1 and winch 204 is activated to raise or lower beam 2 as required to enable connection of connecting member 8 to fifth wheel 14 as previously described. Winch 204 is then activated by an amount sufficient to relieve any residual strain on cable 208 to cause the entire weight of beam 2 to be distributed between fifth wheel 10 and fifth wheel 14 to thereby complete the assembly of beam 2 and its connection to vehicles 12 and 16.

Beam 2 and draw works 202, in their entirety, are quite large and cannot be handled by a single person without assistance. However, due to the fact that beam 2 and draw works 202 consist of a number of individual parts a single person can easily assemble beam 2 and connect beam 2 to vehicles 12 and 16 without need of assistance.

In the performance of phase two, beam 2 remains connected to vehicles 12 and 16 as described above and draw works 202 is disassembled to the extent of removing support posts 302 and 304 and cradle block 300 and routing cable 208 as shown in FIGS. 20A and 20B to thereby assemble draw works 200. Winch saddle 206 on surface 19 is then adjusted as may be required to position point E so that line $EG_1$ is substantially perpendicular to point $G_1$ as shown in FIG. 21.

In addition, cross bar 110, having chains 442 and 442a connected thereto, as described, is placed on center link 18 at a point intermediate winch saddle 206 and connecting member 6. It is preferred that cross bar 110 be positioned substantially vertically above transverse frame brace 446 which is rigidly connected to frame member 108 and 109.

Steps are then taken to prevent rolling movement of vehicle 16 and to permit rolling movement of vehicle 12. Such steps would include setting the wheel brakes on vehicle 16 and releasing the wheel brakes on vehicle 12. Winch 204 is then activated to raise traveling block 210 and vehicle 12 by exerting upward forces at gaps 272 and 274, the points at which traveling block 210 is attached to vehicle 12. It is evident that operation of winch 204, as just mentioned, operates to decrease the length of line EG, which in turn raises point G and places upward force on point B. As a result (as demonstrated in FIGS. 21, 22 and 23): hub K rolls toward hub L; points B and E rotate around point A in a clock wise direction; point G rotates around point B in a counter clock wise direction; and hub M moves vertically and tends to rotate around hub K in a counter clockwise direction. Vehicle 12 moves. Vehicle 16 does not move.

Special attention is invited to FIGS. 18, 20A and 28. Notice that all of the lifting force of draw works 200 is applied to the flanges of frame members 108 and 109, respectively, in gap 272, by the cooperation of grip rod 254 and grip bar 250, and in gap 274, by the cooperation of grip rod 256 and grip bar 252. There is no positive connection between the flanges and grip rods and grip bars other than that afforded by frictional contact. The offset nature of each cooperating rod and bar introduces a bending force into each respective flange, which bending force functions to grip such flange. In addition, gap 272 and gap 274 are not in alignment, they are staggered. Gaps 272 and 274 form point G which, as mentioned, rotates away from winch 204, which forms point E. The arrangement of rods, bars and staggered gaps in traveling block 210, as described, thus acts to resist the tendency of cable 208 from pulling traveling block 210 from contact with vehicle 12.

A detailed description of the operation of phase two is provided below. Example 1 provides a mathematical program for calculating the varius angles and distances involved in phase two and Example 2 is a concrete application of the program in Example 1 to a lift situation.

The immediate practical effect of the operation of the invention, as described above, permits vehicle 12 to be pushed or pulled by vehicle 16 by means of beam 2. However, current highway regulations require that the tire surface of the second bogie wheel of a semi-tractor be raised at least eight inches off the ground before the vehicle may be towed. Point M represents the mentioned second bogie wheel. Accordingly, the operation of draw works 200 is continued until hub M has been raised by an amount sufficient to create the minimum separation between the ground and the tire. Phase two is complete when the minimum separation is achieved.

In the performance of phase three, the operation of winch 204 is terminated, but tension of cable 208 is maintained pending stabilization of vehicle 12 in the lifted condition. Accordingly, the free end of chain 442 extending from hole 432 in cross bar 110 is passed around frame member 108 and transverse frame brace 446 as shown in FIG. 18 and link 450 is looped over hook 444. Similarly, the free end of chain 442a, not shown, extending from hole 436 in cross bar 110 is passed around frame member 109 and transverse frame brace 446 and link 452 (not shown) is looped over hook 448 (not shown). Thereafter, winch 204 is activated to release the tension on cable 208 and draw works 200 is disassembled.

Chains 442 and 442a perform two essential functions. The chains assume the strain formerly held by cable 208. Furthermore, chains 442 and 442a, in effect, convert vehicle 12 into a trailer by preventing rotational movement of surface 61 of connecting member 6 on surface 57 of fifth wheel 10. Rotational movement of surface 100 of connecting member 8 on surface 73 of fifth wheel 14 is not restricted. In a sense the front wheels of vehicle 12 assume the function of the rear wheels of a semi-trailer and connecting member 8 assumes the function of the fifth wheel of a semi-trailer.

The fourth phase of the operation of this invention occurs when vehicle 12 has been towed to some desired location, at which time phases two and three are conducted in reverse order in order to lower vehicle 12 to the ground and disassemble beam 2.

Detailed Description of the Method of Operation of Phase Two

The method of operation of phase two of the invention is explained and can be understood by a person skilled in the art in connection with a study of FIGS. 21, 22, 23 and 24 which are schematic (and highly exaggerated) views of positions assumed by the apparatus of the invention attached to vehicles as seen in FIGS. 1 and 2 during operation of the invention. The specific points identified by capital letters shown in FIGS. 1–20B correspond to the capital letters shown in FIGS. 21–24.

The mentioned study will reveal that figure RAJ is connected to figure HBG by figure ABCD at points A and B by lines CA and DB, respectively. Point E, located intermediate points C and D in figure ABCD, is connected by line EG to point G, located on line HWTG of figure HBG. Figure RAJ is referred to as the stationary frame. Figure HBG is referred to as the lift frame. Figure ABCD is referred to as the lift beam. Point E is referred to as the lift beam point. Point G is referred to as the lift frame point. Line EG is referred to as the lift line.

The structure represented by figure ABCD and the structural elements located at points E and G, all as described above, broadly comprise a graphical simulation of the inventive apparatus of this invention. For purposes only related to the explanation of the operation of this invention, points A and B are included in the structure represented by figure ABCD. Actually, as previously described, the lift beam of this invention extends only to a point along line DB and only to a point along line CA. Point B is a part of a structure represented by figure HBG and point A is a part of a structure represented by figure RAJ. For the remainder of this discussion the words "structure" and "figure" have the same meaning unless a different meaning is expressly stated in the text.

During the performance of the lifting method of the invention, structure RAJ remains stationary while structures HBG and ABCD change positions in direct response to change in length of lift line EG. In this regard, by inspecting FIGS. 21, 22, 23 and 24 in succession, it is seen that decreasing the length of lift line EG causes lift beam ABCD to rotate in the clockwise direction at a radial distance AB around point A and causes lift frame HBG to move toward stationary frame RAJ along line KL and to simultaneously rotate in the counter clockwise direction at a radial distance BT around point B. The point of the operation, and thus the reason for shortening the length of lift line EG, is to cause point M on lift frame HBG to move vertically upwardly with respect to the line connecting point K on lift frame HBG and point L on stationary frame RAJ. The operation is considered to be complete when point M has been raised above line KL by at least a desired minimum distance.

With respect to lift beam ABCD notice that line BD is shorter than line AC. The difference in length of these two lines is not a requirement of the invention, but, for reasons set forth below, such a difference is preferred.

For purposes of explanation only, it is seen in FIG. 21 that line KL is horizontal, that point M lies on line KL, that line $HWTG_1$ is parallel to line KL and that lift line EG is perpendicular to line KL and line $HWTG_1$. It is further seen in FIG. 21 that points A and B lie in a line parallel to line KL and line $HWTG_1$. When the operation begins it is preferred, but not required, that line KL be substantially horizontal, that point M lie on line KL, that line AB be substantially parallel to line KL and that lift line EG be substantially perpendicular to line KL and line $HWTG_1$. Also, for purposes of explanation, point G is designated as point $G_1$ in FIG. 21, point G in FIGS. 22 and 24 and point $G_2$ in FIG. 23.

Figure 22:
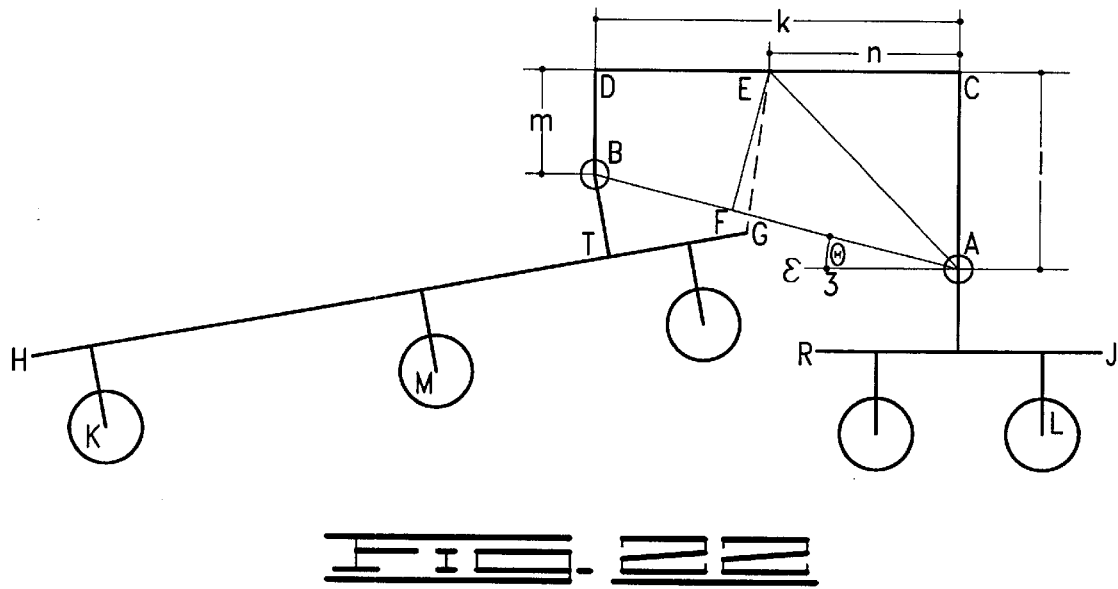
Figure 23:
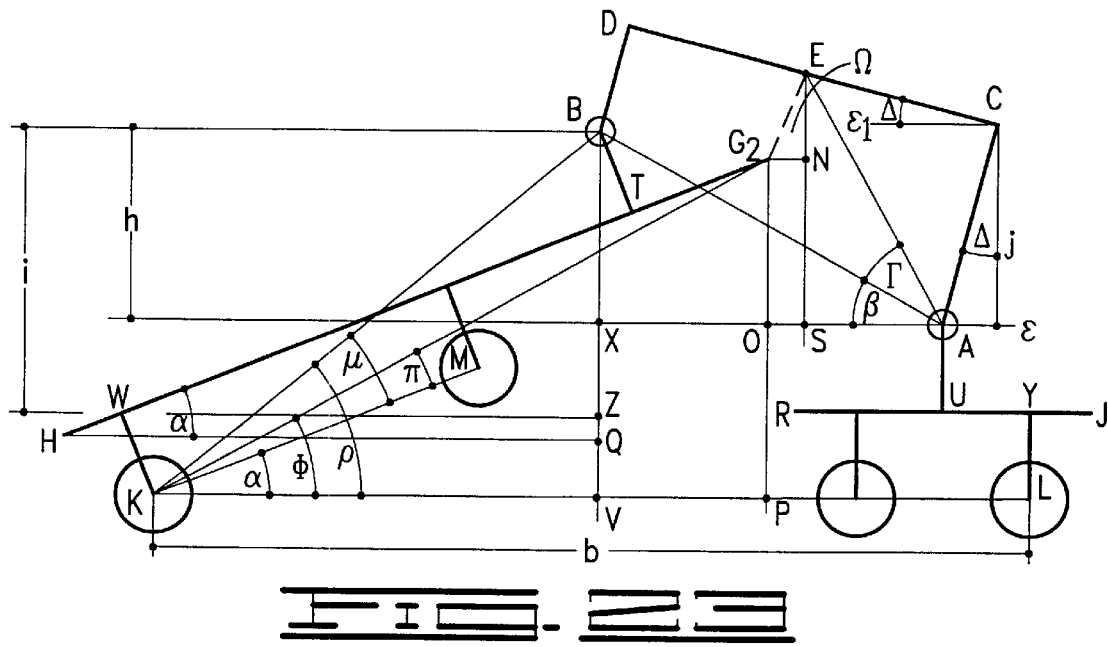
Figure 24:
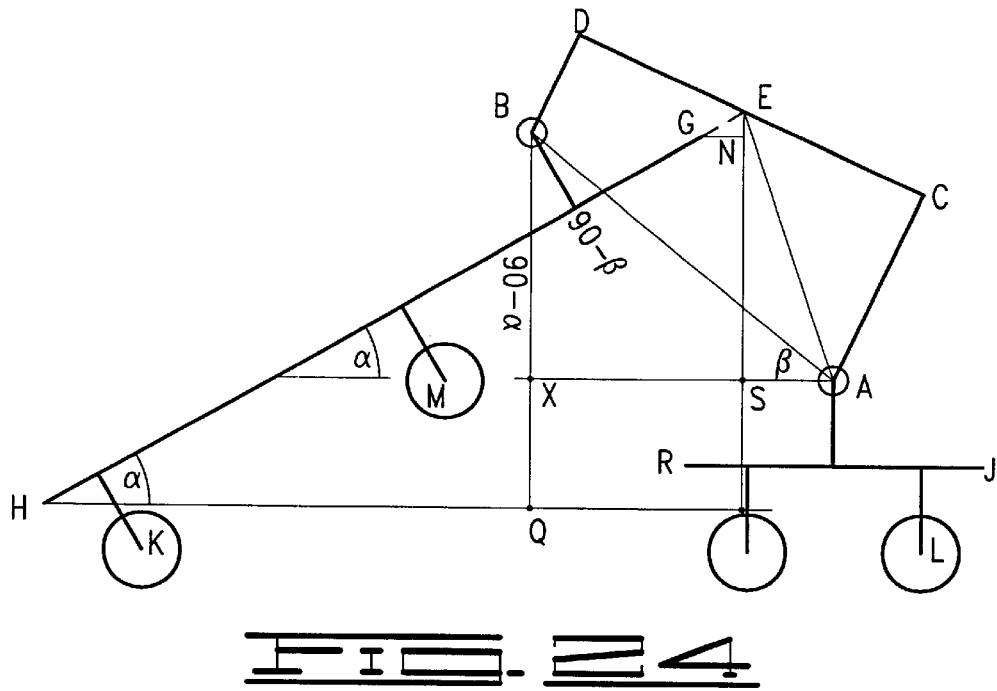

It was mentioned above that lift line $EG_1$ is perpendicular to line $HWTG_1$, therefore, when the operation begins, as seen in FIG. 21, angle $HG_1E$ has a value of 90°. As the operation proceeds, as seen in FIGS. 22, 23 and 24, the angle becomes greater than 90° and could, theoretically, as shown in FIG. 24, attain a maximum value of 180° in which case points H, G, and E would lie on the same straight line HWTGE. At that time lift line EG could no longer be decreased in length and movement of structures HBG and ABCD would, therefore, terminate.

As lift line EG is shortened an angle alpha ($\alpha$) and an angle beta ($\beta$) are formed relative to the horizontal and an angle omega ($\Omega$) is formed relative to the vertical. As seen in FIG. 23, angles $QHG_2$ and MKV are examples of angle $\alpha$, angle BAS is an example of angle $\beta$ and angle $G_2ES$ is an example of angle $\Omega$. Angle $\alpha$ is referred to as the "lift frame angle." Angle $\beta$ is referred to as the "lift beam angle." Angle $\Omega$ is the "lift line angle." The minimum values of the lift frame angle, the lift beam angle and the lift line angle are zero, each of which occur at the beginning of the operation as shown in FIG. 21. The maximum values of the lift frame angle, the lift beam angle and the lift line angle are attained as shown in FIG. 24 when points H, W, T, G, and E lie on the same straight line HWTGE. At these maximum values, it is evident that the lift line angle is the complement of the lift frame angle, that is, $\Omega_{(max)}=90-\alpha_{(max)}$ and that the sum of the lift line angle and the lift frame angle is 90 degrees.

As mentioned previously, the operation is considered to be complete when point M has been raised above line KL by at least a desired minimum distance. At that time, as shown in FIG. 23, angle $\Omega$ is less than $\Omega_{(max)}$ because it is preferred to minimize the size of lift line angle $\Omega$ in order to minimize the size of the horizontal force vector $G_2N$ of lift line EG at point $G_2$. In this regard it is well to again note that the force required to lift structure HBG originates at point E of structure ABCD and is transmitted to point G on structure HBG along lift line EG. Accordingly, lift line EG can be viewed as the resultant of upwardly extending vertical force vector NE and outwardly extending horizontal force vector GN. It is preferred that horizontal force vector GN be equal to or less than vertical force vector NE. Thus, it is preferred, as is evident in FIG. 23, that the sine of angle $\Omega$ be equal to or less than the cosine of angle $\Omega$ upon completion of the lift operation.

In order to produce the desired minimum lift of point M, as previously mentioned, it is obviously required that lift beam angle $\beta$ be sufficiently large to produce the lift. However, in another aspect of this invention, stationary frame RAJ, subsequent to the lift, can be employed to pull (or push) lift frame HBG. The force exerted on lift frame HBG by the pull or push of stationary frame RAJ is obviously transmitted by lift beam ABCD. It is desirable that such force be transmitted by means of a beam which is substantially horizontal. Such a beam is represented by line CD of lift beam ABCD. Accordingly, the minimum size of lift beam angle β necessary to produce the desired minimum vertical movement of point M and to produce the desired substantially horizontal line CD of lift beam ABCD can each be obtained if line BD is shorter than line AC. That condition is shown in FIGS. 21, 22, 23 and 24.

In FIG. 21, at the start of the operation, the unequal lengths of lines BD and AC cooperate to produce angle $EC\Sigma_2$ which is an angle produced at point C below the horizontal. This angle is referred to as the "beam slope-angle before lift" and has a size of Θ degrees. Accordingly, the length of lift line EG need only be decreased by an amount sufficient to make lift beam angle β equal in size to the value, Θ degrees, of the beam slope-angle before lift to produce, as shown in FIG. 22, a condition in which line CD is horizontal. If point M at that stage has been lifted by the desired minimum amount, then the operation is complete.

However, if point M has not been lifted by the desired minimum amount, then the length of lift line EG can be further decreased by an amount sufficient to produce lift beam angle β of size sufficient to produce the desired minimum lift of point M. At that stage, as shown in FIG. 23, line CD slopes downwardly from point C to produce angle $EC\Sigma_1$ which is an angle produced at point C above the horizontal. This angle is referred to as the "beam slope-angle after lift" and has a size of Δ degrees. It is, thus, clear that the size of lift beam angle β is the sum of the beam slope-angle before lift, angle $EC\Sigma_2$, and the beam slope-angle after lift, angle $EC\Sigma_1$.

For purposes of an aspect of this invention wherein structure RAJ is employed to pull or push structure HBG after the lift, line CD will be considered to be substantially horizontal if the beam slope-angle after lift has a value in the range of from about −5 degrees to about +5 degrees, wherein a negative value indicates an angle below the horizontal at point C and a positive value indicates an angle above the horizontal at point C.

The desire to minimize the size of lift line angle Ω in order to minimize the size of the horizontal force vector of lift line EG at point G was previously mentioned. This result can be obtained if line BD is shorter than line AC. By minimizing the required size of lift beam angle β by making line BD shorter than line AC, as described above, the size of lift line angle Ω will also be minimized.

Lines BD and AC must be of lengths sufficient to avoid direct contact between the structural elements positioned at lift beam point E and lift frame point G during the lift operation.

Detailed Description of Operation

Structure ABCD is rotationally connected to structure RAJ at point A and rotates in a clockwise direction around point A in direct response to decrease in the length of lift line $EG_1$, as illustrated in FIG. 21, to the length of lift line $EG_2$, as illustrated in FIG. 23. The radius of rotation is the line AB. Point A is rigidly connected to structure RAJ at point U by line AU which is perpendicular to line RUYJ. Structure RAJ does not move during the lift operation. Accordingly, the axis of rotation, point A, does not move. Point A, is, therefore, referred to as stationary pivot A. It is obvious, but important to note, that point B, as part of structure ABCD, rotates in an arc around point A. For purposes of illustration, it is shown that point B rotates around point A in a clockwise direction.

Structure ABCD is also rotationally connected to structure HBG at point B and flexibly connected to structure HBG at point G. In this regard, point B is rigidly connected to structure HBG at point T by line BT which is perpendicular to line HWTG. Point E, located on line CD intermediate points C and D in structure ABCD, is flexibly connected by lift line EG to structure HBG at point G. Point E, being part of structure ABCD, like point B, rotates around point A in a clockwise direction, wherein the radius of rotation is the line EA. It is, thus, clear that structure HBG, being connected to structure ABCD, also moves in direct response to the decrease in the length of lift line $EG_1$, as illustrated in FIG. 21, to the length of lift line $EG_2$, as illustrated in FIG. 23.

As mentioned, point B is rigidly connected to structure HBG at point T by line BT which is perpendicular to line HWTG. Point K is rigidly connected to structure HBG at point W by line KW which is perpendicular to line HWTG. Point K is thus indirectly connected to point B by radius BK. Accordingly, as structure HBG moves in response to decrease in length of lift line EG, point K moves in a horizontal line toward point L which is rigidly connected to structure RAJ at point Y by line LY which is perpendicular to line RUYJ.

From the above description it is apparent that the movement of structure HBG is compound in nature. In this regard, as the length of line EG is decreased point K, as mentioned, moves linearly toward point L, and structure HBG rotates in an arc around point B, wherein the radius of rotation is radius BT. It could be said, however, that structure HBG rotates in an arc around point K, wherein the radius of rotation is radius BK. Regardless of the perceived axis of rotation, each axis moves. Thus, point K moves linearly toward point L and point B moves in an arc around stationary pivot A. Point B, is referred to as moving pivot B, point K is referred to a moving hub K and point L is referred to as stationary hub L.

Point G, on line HWTG, as part of structure HBG, rotates in an arc around moving pivot B. For purposes of illustration, it is shown that point G rotates around point B in a counter clockwise direction. It is plain, then, that the horizontal element of the circular motion of point E is precisely opposite to the horizontal element of the circular motion of point G. Point E is referred to as the beam lift point and point G is referred to as the frame lift point.

Moving pivot B rotates by an angle β with the horizontal around stationary pivot A and by an angle ρ with the horizontal around moving hub K. Frame lift point G rotates around moving hub K by an angle φ with the horizontal. Hub M, which is rigidly connected to line HWTG of structure HBG by a line perpendicular to line HWTG, rotates from a horizontal line between hubs K and L by an angle a. Lift line EG, as a result of the opposite horizontal movement of points E and G, rotates around point E at an angle Ω with the vertical.

Prior to any movement the distance between hub K and hub L is "a." After movement the distance between hub K and hub L is "b."

The operation of the invention is complete when angle α (or angle β) is sufficiently large to cause hub M to be vertically lifted by a desired minimum amount.

EXAMPLE 1

Mathematical Analysis of the Operation of Phase Two of the Invention

The operation of the invention is explained in mathematical terms in connection with FIGS. 21, 22, 23 and 24 which are schematic illustrations of the elements of the various cooperating structures and the related dimensional and angular relationships involved. FIG. 21 illustrates the positions of structures HBG, ABCD and RAJ before the lift and FIG. 23 illustrates the positions of structures HBG, ABCD and RAJ after the lift. The positions of structures HBG and ABCD change during the lift, but the position of structure RAJ does not change during the lift. Accordingly, structures HBG and ABCD are sometimes referred to as "moving" and structure RAJ is sometimes referred to as "stationary." FIG. 22 illustrates the positions of structures HBG, ABCD and RAJ in the special situation wherein line CD is parallel to Line RJ.

It is assumed for convenience, as shown in FIG. 21, that line HWTG of structure HBG and line RUYJ of structure RAJ before a lift are positioned end-to-end at an angle of 180°. Furthermore, line AB is positioned vertically above and parallel to lines $HWTG_1$ and RUYJ. Still further, line KML is positioned vertically below and parallel to lines $HWTG_1$ and RUYJ.

Point G in structure HBG is designated as point $G_1$ in FIG. 21 and point $G_2$ in FIG. 23. The lengths of lines KL and EG change during the lift.

The specific lengths of the various structural elements shown in FIGS. 21, 22, 23 and 24 have been deliberately sized to facilitate visualization of the change in position of structures HBG and ABCD and their angular relationship each to the other and to structure RAJ.

A. Definition of Lines: Before Lift and After Lift (See FIGS. 21 and 22)
1. Line AB is the Lift Beam Radius. It extends from stationary pivot A to moving pivot B and has a fixed length, "c."
2. Line WT is the portion of moving frame HBG extending from point W to point T on line HWTG. It is equal in length to the horizontal projection of lift frame radius BK, before lift, and has a fixed length, "d."
3. Line AU is a vertical portion of stationary frame RAJ perpendicular to line RJ. It extends from point U on line RUYJ to stationary pivot A and has a fixed length, "e."
4. Line BT is the fixed perpendicular distance, "e," from moving pivot B to point T on line HWTG of moving frame HBG.
5. Line LY is a vertical portion of stationary frame RAJ perpendicular to line RJ. It extends from point Y on line RUYG to stationary hub L and has a fixed length, "f."
6. Line KW is the fixed perpendicular distance, "f," extending from moving hub K to point W on line HWTG.
7. Line CD is the fixed length, "k," extending from point C to point D.
8. Line AC is perpendicular to and is the primary leg of lift beam ABCD. It extends from point C to stationary pivot A and has a fixed length, "I."
9. Line BD is perpendicular to and is the secondary leg of lift beam ABCD. It extends from moving pivot B to point D and has a fixed length, "m."
10. Line CE is the fixed length, "n" along line CD. Line CE extends from lift beam point E to point C.
11. Line UY is the fixed horizontal distance, "p", along line RJ. Line UY extends from point U to point Y.
12. Line KM is the fixed distance, "q," between moving hub K and hub M and is vertically below and parallel to line HWTG.

B. Definition of Lines: Before Lift (See FIG. 21)
1. Primary line KL is the horizontal distance, "a," from moving hub K to stationary hub L.
2. Lift line $EG_1$ is the vertical distance, "g," from lift beam point E to lift frame point G. Line $EG_1$ is perpendicular to point $G_1$ C. Definition of Lines: After Lift (See FIG. 23)
1. Secondary line KL is the horizontal distance, "b," from moving hub K to stationary hub L.
2. Line BX is the vertical distance, "h," from moving pivot B to stationary pivot A. Line BX is perpendicular to a horizontal line through pivot A.
3. Line BZ is the vertical distance, "i," from moving pivot B to horizontal line RUYJ. Line BZ is perpendicular to line RUYJ.
4. Line $C\Sigma$ is the vertical distance, "j," from point C to stationary pivot A. Line $C\Sigma$ is perpendicular to a horizontal line through pivot A.
5. Lift line $EG_2$ is the slant distance from lift beam point E to lift frame point $G_2$.

D. Definition of Angles: Before Lift: (See FIG. 21)
1. Angle $G_1KM$ is the "primary lift frame point angle" and has a size of $\pi$ degrees.
2. Angle BKM is the "primary moving pivot angle" and has a size of $\mu$ degrees.
3. Angle EAB is the "primary beam angle" and has a size of $\Gamma$ degrees.
4. Angle EAC is the "secondary beam angle" and has a size of $\omega$ degrees.
5. Angle $EC\Sigma_2$ is the "primary beam slope angle" and has a size of $\Theta$ degrees.

E. Definition of Angles: After Lift: (See FIG. 23)
1. Angle $G_2HQ$ is the "lift frame angle" and has a size of $\alpha$ degrees.
2. Angle $G_2KV$ is the "secondary lift frame point angle" and has a size of $\phi$ degrees.
3. Angle BKV is the "secondary moving pivot angle" and has a size of $\rho$ degrees.
4. Angle BAS is the "lift beam angle" and has a size of $\beta$ degrees.
5. Angle $G_2ES$ is the "lift line angle" and has a size of $\Omega$ degrees.
6. Angle $EC\Sigma_1$ is the "secondary beam slope angle" and has a size of $\Delta$ degrees.

F. Preliminary Observations: (See FIGS. 21–24)
1. a>b
2. a=d+c+p
3. b=KV+AX+p
4. $\mu$ is constant
5. $\pi$ is constant
6. $\alpha=\pi-\mu$
7. $\phi=\pi+\alpha$
8. $\Gamma=90-\omega-|\Theta|$
9. $\Delta=\beta-|\Theta|$
10. $90=\beta\Gamma+\omega-\Delta$
11. $\angle G_2HQ=\angle MKV=\angle TBQ$
12. $\angle EC\Sigma_2=\angle BA\Sigma_3$
13. $\angle EC\Sigma_1=\angle AC\Sigma$
14. $WG_2=WG_1$
15. $TG_1=BF=TG_2$
16. $G_1U=FA$
17. $\angle BAS=\angle BAX$
18. $FG_1=AU=BT=XZ$
19. $KW=VZ=LY$
20. $KG_1=KG_2$
21. $NS=G_2O$ G. Program NOTE: To solve a problem employing the steps of the following program, refer to FIGS. 21–24 and actually determine, or assume, the values of k, m, I, d, e, f, n, i, a and q. It is believed that, of the foregoing values, the most difficult to obtain will be those for d and i.

1. Primary beam slope angle, $EC\Sigma_2$ $$\Theta = \tan^{-1}[(l-m)/k]$$

NOTE: If l is greater than m, then the sign of $\Theta$ is considered to be negative because the angle is measured below a horizontal line through point C.

2. Lift beam radius, AB $$c = k/(\cos|\Theta|)$$

NOTE: In this calculation use the absolute value of $\Theta$, i.e., $|\Theta|$.

3. Secondary beam angle, EAC $$\omega = \tan^{-1}(n/I)$$

4. Lift beam point radius, EA $$EA = I/(\cos \omega)$$

5. Primary beam angle, EAB $$\lceil = 90 - \omega - |\Theta|$$

NOTE: In this calculation use the absolute value of $\Theta$.

6. Vertical distance from point E to stationary pivot A before lift, EF $$EF = EA \sin \lceil$$

6.a Length of lift line before lift, g $$g = EF + e$$

7. Distance from point F to point A, FA $$FA = EA \cos \lceil$$

8. Distance from point B to point F, BF $$BF = c - FA$$

9. Distance from point D to point E, DE $$DE = k - n$$

10. Primary moving pivot angle, BKM $$\mu = \tan^{-1}[(e+f)/d]$$

11. Lift frame radius, BK $$BK = (d^2 + (e+f)^2)^{1/2}$$

12. Secondary moving pivot angle, BKV $$\rho = \sin^{-1}[(i+f)/BK]$$

13. Lift frame angle, $G_2HQ$ $$\alpha = \rho - \mu$$

14. Vertical rise (lift) of hub M from line KL caused by lift, $M_v$ $$M_v = q \sin \alpha$$

15. Vertical movement of point B caused by lift, h $$h = i - e$$

16. Lift beam angle, BAX $$\rho = \sin^{-1}(h/c)$$

17. Secondary beam slope angle, $EC\Sigma_1$ $$\Delta = \rho - |\Theta|$$

NOTE: In this calculation use the absolute value of $\Theta$. If, as a result of the calculation, the sign of $\Delta$ is negative, then the angle is measured below a horizontal line through point C; if the sign is positive, then the angle is measured above a horizontal line through point C; and if the value of the angle is zero, then line CD is horizontal.

17.a $$90 = \beta + \lceil + \omega - \Delta$$

NOTE: This is a check calculation.

18. Horizontal distance from hub K to lift point G, $WG_1$ $$WG_1 = d + c - FA$$

19. Primary lift frame point angle, $G_1KM$ $$\pi = \tan^{-1}[(f)/(WG_1)]$$

20. Secondary lift frame point angle, $G_2KV$ $$\phi = \pi + \alpha$$

21. Lift frame point radius, $KG_1$ $$KG_1 = WG_1/\cos \pi = KG_2$$

22. Vertical distance from point $G_2$ to stationary pivot A after lift, $G_2O$ $$G_2O = KG_2 \sin \phi - (e+f)$$

23. Horizontal distance from point A to hub L, p $$p = a - d - c$$

24. Secondary line, KL $$b = BK \cos \rho + c \cos \beta + p$$

24a Horizontal movement of lifted vehicle toward stationary vehicle caused by lift, $V_h$ $$V_h = a - b$$

25. Horizontal distance from point $G_2$ to stationary pivot A after lift, OA $$OA = b - KG_1 \cos \phi - p$$

26. Vertical distance from point E to stationary Pivot A after lift, ES $$ES = EA \sin(\beta + \lceil)$$

27. Horizontal distance from point E to stationary Pivot A after lift, SA $$SA = EA \cos(\beta + \lceil)$$

28. Lift Line Angle, $G_2EN$ $$\Omega = \tan^{-1}[(OA - SA)/(ES - G_2O)]$$

NOTE: $G_2N = (OA - SA)$ and $EN = (ES - G_2O)$

29. Length of lift line after lift, $EG_2$ $$EG_2=(ES-G_2O)/\cos \Omega$$

30. Decrease in length of lift line caused by lift, $EG_d$ $$EG_d=g-EG_2$$

30. Horizontal separation of point G and point E caused by lift, $G_2N$ $$G_2N=(OA-SA)$$

31. Vertical movement of point E caused by lift, $E_v$ $$E_v==ES-EF$$

32. Vertical movement of point G caused by lift, $G_v$ $$G_v=G_2O+e$$

33. Horizontal movement of point G caused by lift, $G_h$ $$G_h=FA-OA$$

34. Horizontal movement of point E caused by lift, $E_h$ $$E_h=FA-SA$$

EXAMPLE 2

The program set forth in part G of Example 1, above, was employed to predict the vertical lift of hub M of vehicle 12 as shown in FIG. 1. According to current relevant official regulations the tread of the tire, as shown by reference numeral 67, on hub M must be raised a minimum of eight inches off the road surface before vehicle 12 may be pulled by vehicle 16.

In this example vehicles 12 and 16 are large tractor trucks of the type referred to in the art as "semis." Vehicles 12 and 16 are connected by beam 2 as described above wherein center link 18 is a hollow steel member of rectangular cross section having a height of 8 inches, a width of 6 inches and a length of 60 inches. First end link 20 is a hollow steel member of rectangular cross section having a height of 7 inches, a width of 5 inches and a length of 72 inches. Second end link 22 is a hollow steel member of rectangular cross section having a height of 7 inches, a width of 5 inches and a length of 84 inches. It is evident that the height and width dimensions of the center link are greater than the height and width dimensions of the two end links to thereby enable the slidable insertion of the end links into the hollow interior of the center link.

In this example the difference in height dimensions of the center link and end links, as set out above, is sufficient to enable the placement of a small pads between discreet separated horizontal surfaces of the end links and the center link at points 104, 106, 108 and 111 as seen in FIG. 14. These pads, which are not shown, are quite small, i.e., about 4 inches long, 1.5 inches wide and 3/16 of an inch thick, are rigidly attached to the bottom surfaces of the extreme proximal ends of end links 20 and 22 and to the top surfaces of end links 20 and 22 at positions just within the hollow interior of center link 18. The pads thus operate, in combination with the horizontal interior surface surfaces of center link 18, to force the proximal end of each end link in an upward direction and the distal end of each end link in a downward direction. The net result is that linear member 4 assumes the shape of a slightly inverted "V", i.e., concave downward.

Receiver 34, in this example, is a hollow steel member of rectangular cross section having a height of 8 inches, a width of 6 inches and a length of 12 inches. Bottom support plate 50 is a circular flat steel plate having diameter of 19 inches. The distance from top surface 60 of receiver 34 to bottom surface 61 of plate 50 is 8.25 inches.

Receiver 36, in this example, is a hollow steel member of rectangular cross section having a height of 8 inches, a width of 6 inches and a length of 12 inches. Base 72 is a hollow steel member of rectangular cross section having a height of 8 inches, a width of 6 inches and a length of 12 inches. Bottom support plate 82 is a circular flat steel plate having diameter of 19 inches. The distance from top surface 112 of receiver 36 to bottom surface 100 of plate 82 is 16.25 inches.

Beam 2 is assembled and attached to vehicles 12 and 16 as described above. Thereafter, referring to FIGS. 21 and 22, it is determined that: k=138 inches; m=11.25 inches; I=19.25 inches; d=216 inches; e=13 inches; f=12 inches; n=96 inches; and q=192 inches. All of these dimensions are, and remain constant, during the entire lift process and can be conveniently determined upon completion of the attachment of beam 2 to vehicles 12 and 16 and prior to the lift itself. Furthermore, prior to lift, the distance, a, from hub K to hub L is determined to be 564 inches.

At this point it can be calculated that the primary beam slope angle, $\Theta$, has an absolute value of about 3.32 degrees and that it is considered to be negative because the angle is measured below a horizontal line through point C, i.e., I is greater than m. Furthermore, as a part of the calculations, it can be determined that the length of the cable before lift is about 26.66 inches.

To complete the required input it is assumed that point B, as a result of the lift, will be positioned 24 inches vertically above line RJ of frame RAJ, i.e., i=24. Such a position can be calculated to be a vertical movement of point B of about 11 inches above a horizontal line through point A.

Calculations according to the program reveal, among other things, that reducing the length of the lift line by an amount of about 5.45 inches will produce the assumed movement of point B, a vertical rise of hub M of about 9.81 inches, a secondary beam slope angle, $\Delta$, of about 1.25 degrees, a lift line angle, $\Omega$, of about 0.93 degrees and a distance, b, from hub K to hub L of about 562 inches. Accordingly, the lift frame angle, $\alpha$, is about 2.93 degrees, the lift beam angle, $\beta$, is about 4.56 degrees. Frame HBG will have moved toward frame RAJ by an amount of about 2 inches and the vertical distance between point E and point G will have decreased by an amount of about 5.45 inches. The sum of lift line angle, $\Omega$, and lift frame angle, $\alpha$ is less than 90 degrees, therefore, the maximum values of these angles, as seen in FIG. 24, has not been attained. Also, it can be calculated that the sine of $\Omega$ is less than the cosine of $\Omega$ to thus comply with the condition illustrated in FIG. 23.

Since beam 2, after lift, is substantially horizontal ($\Delta$ is about 1.25 degrees) vehicle 12, after attachment of chains 442, as described, is in condition to be pulled, or pushed, by vehicle 16.

It is emphasized that this example is based upon rigid structures. However, it should be understood that vehicles 12 and 16 can be equipped with suspension systems of various types, including mechanical and pneumatic, which will function to alter the results produced by the program.

Having described the invention that which is claimed is:

1. An apparatus for lifting a load, said apparatus comprising a beam and a draw works wherein:

said beam is comprised of an elongated member, a first connecting member, having a first distal end and a first proximal end, and a second connecting member, having a second distal end and a second proximal end;

said elongated member is comprised of a center link positioned intermediate a first end link and a second end link, wherein said center link has a hollow interior, a first end and a second end, said first end link has a first proximal end and a first distal end, wherein said first proximal end of said first end link is slidably inserted into said hollow interior of said center link at said first end of said center link, and said first end link is removably connected to said center link; and said second end link has a second proximal end and a second distal end, wherein said second proximal end of said second end link is slidably inserted into said hollow interior of said center link at said second end of said center link, and said second end link is removably connected to said center link to thereby form said elongated member having a top side, a bottom side, a right side, a left side, a first end and a second end;

said first proximal end of said first connecting member is attached to said first end of said elongated member whereby said first connecting member projects downwardly from and substantially perpendicular to said bottom side of said elongated member and said first distal end of said first connecting member is adapted for rotational attachment to said load at a first pivot connected to said load;

said second proximal end of said second connecting member is attached to said second end of said elongated member whereby said second connecting member projects downwardly from and substantially perpendicular to said bottom side of said elongated member and said second distal end of said second connecting member is adapted for rotational attachment to a stationary base at a second pivot connected to said stationary base;

said draw works is comprised of a winch, a traveling block and a flexible line, having a free end and a winch end, wherein said flexible line connects said winch and said traveling block;

said winch is supported by and slidably positioned on said top side of said elongated member intermediate said first end and said second end of said elongated member; and said traveling block is positioned below said bottom side of said elongated member and is adapted to grip said load at a position intermediate said first pivot and said second pivot.

2. The apparatus of claim 1 wherein said first distal end of said first end link is removably connected to said first proximal end of said first connecting member and said second distal end of said second end link is removably connected to said second proximal end of said second connecting member.

3. The apparatus of claim 2 wherein the length of said second connecting member is greater than the length of said first connecting member.

4. The apparatus of claim 3 wherein said first end link and said second end link are each equipped with means to produce a slightly inverted "V"shape in said elongated member upon insertion of said first end link and said second end link into said hollow interior of said center link.

5. The apparatus of claim 3 wherein said first distal end of said first connecting member is a first king pin, said first pivot is a first fifth wheel, said second distal end of said second connecting member is a second king pin and said second pivot is a second fifth wheel.

6. The apparatus of claim 1 wherein said winch is rigidly mounted on a winch saddle, said winch saddle being supported by, and slidably positioned on, said center link, and having a left vertical side and a right vertical side;

a first left ear, having a first winch pulley mounted thereon, extends outwardly from said left vertical side of said winch saddle; and a first right ear, having a second winch pulley mounted thereon, extends outwardly from said right vertical side of said winch saddle.

7. The apparatus of claim 6 wherein said traveling block is a linear bar having an upper surface, a left end and a right end; a first block pulley is mounted on said upper surface of said traveling block at said left end and a second block pulley is mounted on said upper surface of said traveling block at said right end, wherein said left end of said traveling block extends outwardly from said left side of said beam and said right end of said traveling block extends outwardly from said right side of said beam.

8. The apparatus of claim 7 wherein said flexible line passes from said winch end of said flexible line at said winch to said second block pulley, then to said second winch pulley, then to said first winch pulley, then to said first block pulley and then to said winch where said free end of said flexible line is attached to said winch saddle to thereby connect said winch and said traveling block.

9. An apparatus for lifting a beam having a top side, a bottom side, a right side, a left side, a first end and a second end, said apparatus comprising a connector and a draw works wherein:

said connector is comprised of an elongated member having a distal end and a proximal end, wherein said proximal end of said connector is adapted for rigid attachment to said first end of said beam and said distal end of said connector is adapted for rotational attachment to a pivot connected to a first stationary base;

said draw works is comprised of a winch, a cradle block, a first vertical support post, a second vertical support post and a flexible line, having a free end and a winch end, wherein said flexible line connects said winch, said cradle block, said first vertical support post and said second vertical support post;

said winch is adapted for slidable support on said top side of said beam intermediate said first end and said second end of said beam;

said cradle block, having a left vertical side and a right vertical side, is positioned below and is attached to said winch whereby a gap, adapted to contain and support said beam at a point intermediate said first end and said second end of said beam, is formed between said winch and said cradle block; a left ear, having a first winch pulley mounted thereon, extends outwardly from said left vertical side of said cradle block and a right ear, having a second winch pulley mounted thereon, extends outwardly from said right vertical side of said cradle block;

a first support pulley is mounted on said first vertical support post adjacent the top thereof, and the bottom of said first vertical support post is adapted for attachment to a second stationary base positioned below said cradle block, wherein said bottom of said first vertical support post is substantially vertically below said first winch pulley and said first support pulley is positioned substantially vertically above said first winch pulley and said winch;

a second support pulley is mounted on said second vertical support post adjacent the top thereof, and the bottom of said second vertical support post is adapted for attachment to said second stationary base positioned below said cradle block, wherein said bottom of said second vertical support post is substantially vertically below said second winch pulley and said second support pulley is positioned substantially vertically above said second winch pulley and said winch;

said flexible line passes from said winch end of said flexible line at said winch to said first support pulley, then to said first winch pulley, then to said second winch pulley, then to said second support pulley and then to said bottom of said second vertical support post where said free end of said flexible line is adapted for attachment to said second stationary base to thereby connect said winch, said cradle block, said first vertical support post and said second vertical support post.

* * * * *